(12) United States Patent
Sasaki et al.

(10) Patent No.: US 11,984,569 B2
(45) Date of Patent: May 14, 2024

(54) ENERGY STORAGE APPARATUS

(71) Applicant: GS Yuasa International Ltd., Kyoto (JP)

(72) Inventors: Shun Sasaki, Kyoto (JP); Yoshimasa Toshioka, Kyoto (JP)

(73) Assignee: GS YUASA INTERNATIONAL LTD., Kyoto (JP)

(*) Notice: Subject to any disclaimer, the term of this patent is extended or adjusted under 35 U.S.C. 154(b) by 910 days.

(21) Appl. No.: 16/981,940

(22) PCT Filed: Mar. 6, 2019

(86) PCT No.: PCT/JP2019/008863
§ 371 (c)(1),
(2) Date: Sep. 17, 2020

(87) PCT Pub. No.: WO2019/181508
PCT Pub. Date: Sep. 26, 2019

(65) Prior Publication Data
US 2021/0119310 A1  Apr. 22, 2021

(30) Foreign Application Priority Data
Mar. 23, 2018  (JP) ................. 2018-057009

(51) Int. Cl.
*H01G 11/10* (2013.01)
*H01M 10/0525* (2010.01)
(Continued)

(52) U.S. Cl.
CPC .......... *H01M 10/647* (2015.04); *H01G 11/10* (2013.01); *H01M 10/0525* (2013.01);
(Continued)

(58) Field of Classification Search
CPC ............ H01M 50/209; H01M 50/249; H01M 50/289–293; H01M 50/20;
(Continued)

(56) References Cited

U.S. PATENT DOCUMENTS 8,124,262 B2  2/2012 Okada et al.
8,999,555 B2  4/2015 Kume et al.
(Continued)

FOREIGN PATENT DOCUMENTS

JP  2009-110833 A  5/2009
JP  2010-040181 A  2/2010
(Continued)

OTHER PUBLICATIONS

International Search Report (ISR) (PCT Form PCT/ISA/210), in PCT/JP2019/008863, dated Jun. 4, 2019.

*Primary Examiner* — Eugenia Wang
(74) *Attorney, Agent, or Firm* — MCGINN I.P. LAW GROUP, PLLC

(57) ABSTRACT

An energy storage apparatus includes an energy storage device and a spacer disposed adjacent to the energy storage device in a first direction, in which the spacer is disposed inward of the energy storage device in a second direction orthogonal to the first direction when viewed from the first direction, and has a concave-convex portion having at least one of a concave portion and a convex portion formed at an end portion in the second direction, and the concave-convex portion is disposed separated from the energy storage device.

20 Claims, 10 Drawing Sheets

(51) Int. Cl.
 *H01M 10/647* (2014.01)
 *H01M 10/653* (2014.01)
 *H01M 50/209* (2021.01)
 *H01M 50/249* (2021.01)
 *H01M 50/291* (2021.01)

(52) U.S. Cl.
 CPC ....... *H01M 10/653* (2015.04); *H01M 50/209* (2021.01); *H01M 50/249* (2021.01); *H01M 50/291* (2021.01)

(58) Field of Classification Search
 CPC ............. H01M 10/653; H01M 10/647; H01M 10/0525; H01M 10/6555; H01M 50/284; H01M 2220/20; H01G 11/10; H01G 11/76; H01G 11/82; H01G 11/78; Y02E 60/10; Y02T 10/70

See application file for complete search history.

(56) References Cited

U.S. PATENT DOCUMENTS

| | | | |
|---|---|---|---|
| 9,876,207 | B2 | 1/2018 | Tokoo et al. |
| 10,347,881 | B2 | 7/2019 | Han |
| 2009/0111010 | A1 | 4/2009 | Okada et al. |
| 2012/0003526 | A1 | 1/2012 | Kume et al. |
| 2013/0273404 | A1 | 10/2013 | Ochi et al. |
| 2016/0149180 | A1 | 5/2016 | Tokoo et al. |
| 2016/0308186 | A1 | 10/2016 | Han |
| 2018/0123105 | A1 | 5/2018 | Tokoo et al. |
| 2021/0288363 | A1* | 9/2021 | Okada .................... H01G 11/10 |

FOREIGN PATENT DOCUMENTS

| | | | |
|---|---|---|---|
| JP | 2010-287550 A | 12/2010 | |
| JP | 2012-014962 A | 1/2012 | |
| JP | 2014-072063 A | 4/2014 | |
| JP | WO2012/057322 A1 | 5/2014 | |
| JP | 2014-203753 A | 10/2014 | |
| JP | 2015-005362 A | 1/2015 | |
| JP | 2015-211013 A | 11/2015 | |
| WO | WO-2018042763 A1 * | 3/2018 | .......... H01M 10/613 |

* cited by examiner

US 11,984,569 B2

ENERGY STORAGE APPARATUS

TECHNICAL FIELD

The present invention relates to an energy storage apparatus which includes an energy storage device and a spacer.

BACKGROUND ART

Conventionally, an energy storage apparatus including an energy storage device and a spacer is widely known. Patent Document 1 discloses an energy storage apparatus (battery module) including an energy storage device (battery cell) and a spacer, in which the spacer is configured to have side wall portions facing both side surfaces of the energy storage device.

PRIOR ART DOCUMENT

Patent Document

Patent Document 1: JP-A-2015-5362

SUMMARY OF THE INVENTION

Problems to be Solved by the Invention

The above-described energy storage apparatus with the conventional configuration cannot achieve downsizing.

An object of the present invention is to provide an energy storage apparatus capable of achieving downsizing.

Means for Solving the Problems

An energy storage apparatus according to an aspect of the present invention is an energy storage apparatus including an energy storage device and a spacer disposed adjacent to the energy storage device in a first direction, in which the spacer is disposed inward of the energy storage device in a second direction orthogonal to the first direction when viewed from the first direction, and has a concave-convex portion having at least one of a concave portion and a convex portion formed at an end portion in the second direction, and the concave-convex portion is disposed separated from the energy storage device.

The present invention can be realized not only as an energy storage apparatus described above but also as a spacer included in the energy storage apparatus.

Advantages of the Invention

According to the energy storage apparatus of the present invention, downsizing can be achieved.

MODE FOR CARRYING OUT THE INVENTION

Figure 1:
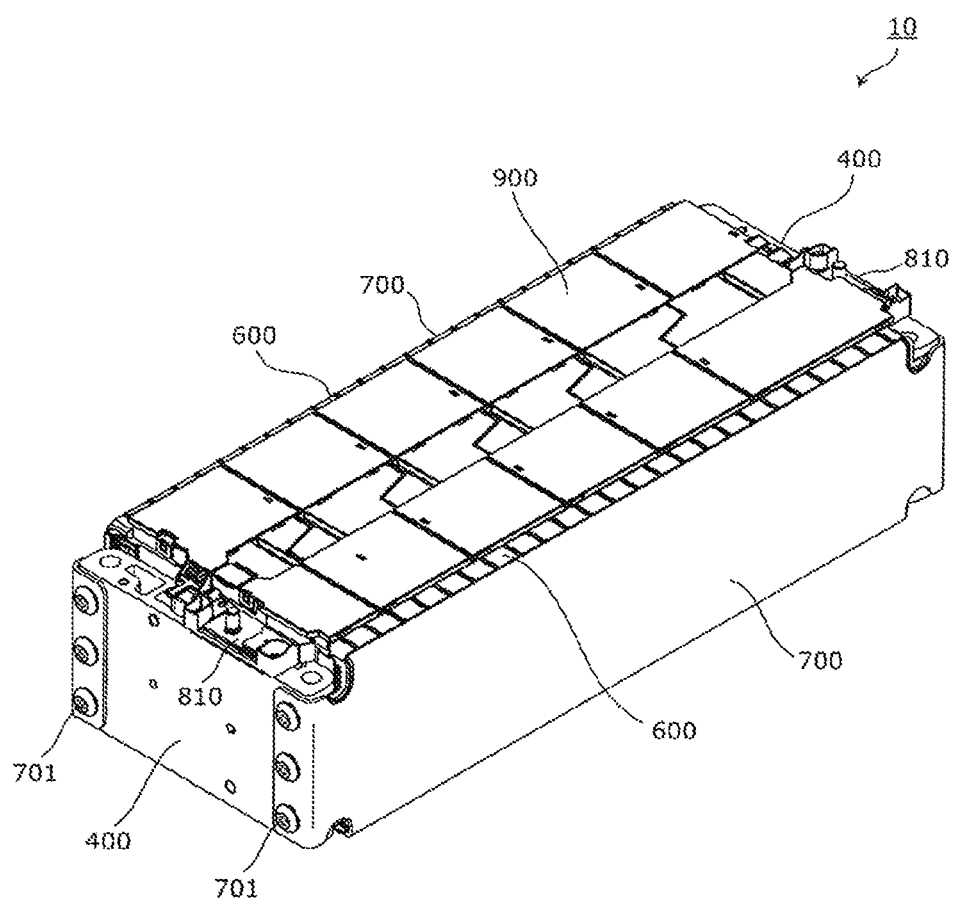
FIG. 1 is a perspective view showing an external appearance of an energy storage apparatus according to an embodiment.

The above-described energy storage apparatus with the conventional configuration cannot achieve downsizing. That is, in Patent Document 1 described above, the spacer is intended to insulate the side surface side of the energy storage device by sandwiching both side surfaces of the energy storage device with the side wall portions. However, since the spacer has the side wall portions, the width of the energy storage apparatus increases, and thus, downsizing of the energy storage apparatus cannot be achieved.

An energy storage apparatus according to an aspect of the present invention is an energy storage apparatus including an energy storage device and a spacer disposed adjacent to the energy storage device in a first direction, in which the spacer is disposed inward of the energy storage device in a second direction orthogonal to the first direction when viewed from the first direction, and has a concave-convex portion having at least one of a concave portion and a convex portion formed at an end portion in the second direction, and the concave-convex portion is disposed separated from the energy storage device.

According to this, in the energy storage apparatus, the spacer is disposed inward of the energy storage device in the second direction when viewed from the first direction, and has the concave-convex portion having at least one of the concave portion and the convex portion at the end portion in the second direction, and the concave-convex portion is disposed separated from the energy storage device. By thus disposing the spacer inward of the energy storage device in the second direction (that is, forming so as not to protrude from the energy storage device in the second direction), it is possible to prevent the width of the energy storage apparatus in the second direction from increasing. By forming the concave-convex portion that is separated from the energy storage device at the end portion of the spacer in the second direction, it is possible to increase a creepage distance between the energy storage device and another member (adjacent energy storage device, etc.) at the end portion of the spacer in the second direction. This makes it possible to achieve downsizing of the energy storage apparatus while achieving insulation at the end portion of the energy storage device in the second direction.

The spacer may include a main body portion and a protruding portion that protrudes from the main body portion in the second direction, and the concave-convex portion may be formed on the protruding portion.

According to this, the spacer has the protruding portion that protrudes from the main body portion in the second direction, and the concave-convex portion is formed on the protruding portion. Here, if the entire width of the spacer in the second direction is widened to increase the creepage distance, a part of the end portion of the spacer may protrude from the end surface of the energy storage device due to an error in dimensional accuracy during manufacturing of the spacer. On the other hand, it may not be necessary to increase the creepage distance depending on the position because an insulating sheet is disposed on the energy storage device. For this reason, the protruding portion is formed at a portion of the spacer where it is necessary to increase the creepage distance, and the concave-convex portion is formed on this protruding portion. This can prevent the spacer from protruding from the energy storage device due to an error in the dimensional accuracy of the spacer. As described above, since the width of the energy storage apparatus in the second direction can be prevented from increasing, the downsizing of the energy storage apparatus can be achieved.

The concave-convex portion may have a convex portion that protrudes in a direction opposite to the first direction along a corner of the energy storage device. The energy storage device may have a long side surface and a short side surface, and the corner may be disposed between the long side surface and the short side surface.

According to this, the concave-convex portion of the spacer has the convex portion that protrudes along the corner of the energy storage device. By thus forming the convex portion that protrudes along the corner of the energy storage device at the end portion of the spacer in the second direction, it is possible to prevent the width of the energy storage apparatus in the second direction from increasing while increasing the creepage distance at the end portion of the spacer in the second direction.

The concave-convex portion may have a concave portion recessed in a surface of the end portion.

According to this, the concave-convex portion of the spacer has the concave portion recessed in the surface of the end portion. By thus forming the concave portion at the end portion of the spacer in the second direction, it is possible to prevent the width of the energy storage apparatus in the second direction from increasing while increasing the creepage distance at the end portion of the spacer in the second direction.

The concave portion may be extended in a third direction intersecting the first direction and the second direction.

According to this, since the concave portion provided in the concave-convex portion of the spacer is extended in the third direction, the creepage distance at the end portion of the spacer in the second direction can be increased over the third direction.

The concave portion may be recessed in a direction opposite to the first direction.

According to this, since the concave portion provided in the concave-convex portion of the spacer is recessed in the direction opposite to the first direction, it is possible to increase the creepage distance with respect to a member (another member (adjacent energy storage device, etc.) sandwiching the spacer with the energy storage device) located in the first direction of the spacer.

Further, an insulating member inserted into the concave portion may be provided.

According to this, the energy storage apparatus includes the insulating member that is inserted into the concave portion of the spacer. By thus inserting the insulating member into the concave portion of the end portion of the spacer in the second direction, it is possible to prevent the width of the energy storage apparatus in the second direction from increasing while further increasing the creepage distance at the end portion of the spacer in the second direction.

Hereinafter, an energy storage apparatus according to an embodiment of the present invention is described with reference to the drawings. The embodiments described below show comprehensive or specific examples. However, numerical values, shapes, materials, components, arrangement positions and connection modes of the components, manufacturing processes, order of manufacturing processes, and the like described in the embodiments hereinafter are only examples and are not intended to limit the present invention. Among the components in the embodiments described hereinafter, the components which are not described in independent claims which describe uppermost concepts are described as arbitrary components. In each drawing, dimensions and the like are not strictly shown.

In the following description and drawings, the arrangement direction of a pair of electrode terminals in one energy storage device, the facing direction of a pair of short side surfaces in a case of one energy storage device, the arrangement direction of an insulator, the arrangement direction of a side plate, or the arrangement direction of an insulator and a side plate is defined as the X-axis direction. The arrangement direction of energy storage devices, the arrangement direction of spacers (intermediate spacers, end spacers), the arrangement direction of end members, the arrangement direction of energy storage devices, spacers, and end members, the facing direction of a pair of long side surfaces in a case of one energy storage device, or the thickness direction of the energy storage device, the spacer, or the end member is defined as the Y-axis direction. The arrangement direction of a case body and a lid of the energy storage device, the arrangement direction of the energy storage device, a bus bar, and a bus bar holding member, or the vertical direction is defined as the Z-axis direction. These X-axis direction, Y-axis direction, and Z-axis direction are directions that intersect each other (orthogonal in the present embodiment). Although the Z-axis direction may not be in the vertical direction depending on the usage mode, the Z-axis direction will be described below as the vertical direction for convenience of explanation. In the following description, the X-axis plus direction indicates the arrow direction of the X-axis, and the X-axis minus direction indicates the direction opposite to the X-axis plus direction. The same applies to the Y-axis direction and the Z-axis direction.

The Y-axis minus direction is an example of the first direction, the X-axis direction is an example of the second direction, and the Z-axis direction is an example of the third direction. That is, the first direction is a direction in which the spacer is disposed with respect to the energy storage device, the second direction is a direction orthogonal to the first direction, and the third direction is a direction intersecting the first direction and the second direction.

Embodiment

[1 General Description of Energy Storage Apparatus 10]

Figure 2:
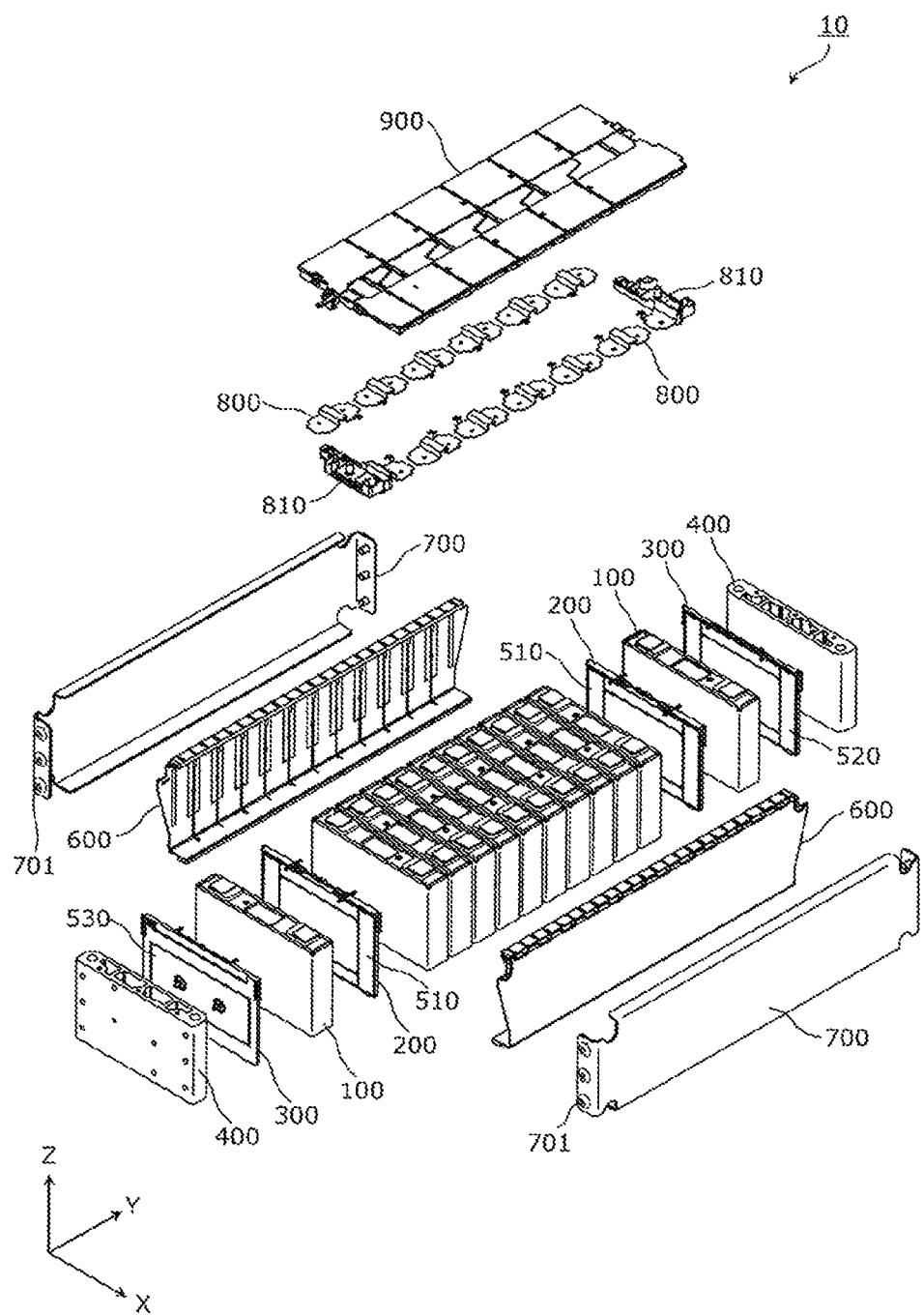
FIG. 2 is an exploded perspective view showing components when the energy storage apparatus according to the embodiment is disassembled.

First, a configuration of an energy storage apparatus 10 is described. FIG. 1 is a perspective view showing an external appearance of the energy storage apparatus 10 according to the present embodiment. FIG. 2 is an exploded perspective view showing components when the energy storage apparatus 10 according to the present embodiment is disassembled.

The energy storage apparatus 10 is an apparatus which is charged with electricity from the outside or can discharge electricity to the outside. The energy storage apparatus 10 is a battery module (assembled battery) used for power storage application, power source application, or the like. Specifically, the energy storage apparatus 10 is used as a battery or the like for driving or starting engine of a moving body, such as an automobile such as an electric vehicle (EV), a hybrid electric vehicle (HEV), or a plug-in hybrid electric vehicle (PHEV), a motorcycle, a watercraft, a snowmobile, an agricultural machine, or a construction machine.

As shown in FIGS. 1 and 2, the energy storage apparatus 10 includes a plurality of (twelve in the present embodiment) energy storage devices 100, a plurality of spacers 200 and 300 (in the present embodiment, eleven spacers 200 and one pair of spacers 300), a pair of end members 400, a pair of insulators 600, a pair of side plates 700, a bus bar 800, and a bus bar holding member 900. A joining member 510 is disposed between the energy storage device 100 and the spacer 200, a joining member 520 is disposed between the energy storage device 100 and the spacer 300, and a joining member 530 is disposed between the spacer 300 and the end member 400. A pair of external terminals 810 (a positive electrode external terminal and a negative electrode external terminal) that are terminals of the energy storage apparatus 10 are connected to the bus bar 800. The energy storage apparatus 10 also includes a wiring for voltage measurement of the energy storage device 100, a wiring for temperature measurement, a thermistor, and the like, but these are not shown and detailed description thereof is also omitted. The energy storage apparatus 10 may also include a circuit board for monitoring the charge state or discharge state of the energy storage device 100 or an electric device such as a relay.

The energy storage device 100 is a secondary battery (battery cell) which is charged with electricity or can discharge electricity, and more specifically, is a non-aqueous electrolyte secondary battery such as a lithium ion secondary battery. The energy storage device 100 has a flat rectangular parallelepiped shape (square shape) and is arranged adjacent to the spacers 200 and 300. That is, each of the plurality of energy storage devices 100 is alternately arranged with each of the plurality of spacers 200 and 300, and is arranged in the Y-axis direction. In the present embodiment, the eleven spacers 200 are arranged between the adjacent energy storage devices 100 among the twelve energy storage devices 100, respectively. The pair of spacers 300 are arranged at positions sandwiching the energy storage devices 100 at the end portions among the twelve energy storage devices 100.

The number of energy storage devices 100 is not limited to twelve and may be a number other than twelve. The shape of energy storage device 100 is not limited to a rectangular parallelepiped shape, and may be a polygonal prism shape other than a rectangular parallelepiped shape, or may be a laminate-type energy storage device. The energy storage device 100 is not limited to a non-aqueous electrolyte secondary battery, and may be a secondary battery other than the non-aqueous electrolyte secondary battery or may be a capacitor. The energy storage device 100 may be a primary battery that can use the electricity which is stored without the user having to charge the battery, instead of the secondary battery. The energy storage device 100 may be a battery using a solid electrolyte. The detailed description of a configuration of the energy storage device 100 is given later.

The spacers 200 and 300 are rectangular and plate-shaped spacers arranged lateral to (in the Y-axis plus direction or Y-axis minus direction) the energy storage device 100 for insulating the energy storage device 100 from other members. Specifically, the spacer 200 is an intermediate spacer disposed between the two adjacent energy storage devices 100 for insulating between the two energy storage devices 100. More specifically, the joining members 510 are arranged on both sides of the spacer 200 in the Y-axis direction, and the joining members 510 join the spacer 200 and the energy storage devices 100 on both sides in the Y-axis direction. In the present embodiment, the eleven spacers 200 are arranged corresponding to the twelve energy storage devices 100. However, when the number of energy storage devices 100 is other than twelve, the number of spacers 200 is also changed according to the number of energy storage devices 100.

The spacer 300 is an end spacer that is disposed between the energy storage device 100 at the end portion and the end member 400 for insulating between the energy storage device 100 at the end portion and the end member 400. Specifically, the joining member 520 is disposed on the energy storage device 100 side of the spacer 300, and the spacer 300 and the energy storage device 100 are joined by the joining member 520. The joining member 530 is disposed on the end member 400 side of the spacer 300, and the spacer 300 and the end member 400 are joined by the joining member 530. The detailed description of a configuration of these spacers 200 and 300 will be given later.

The end member 400 and the side plate 700 are members that press the energy storage device 100 from the outside in an arrangement direction (Y-axis direction) of the plurality of energy storage devices 100. That is, the end member 400 and the side plate 700 sandwich the plurality of energy storage devices 100 from both sides in the arrangement direction, thereby pressing the respective energy storage devices 100 included in the plurality of energy storage devices 100 from both sides in the arrangement direction.

Specifically, the end members 400 are flat block-shaped end plates (holding members) arranged on both sides of the plurality of energy storage devices 100 in the Y-axis direction for sandwiching and holding the plurality of energy storage devices 100 from both sides in the arrangement direction (Y-axis direction) of the plurality of energy storage devices 100. The end member 400 is formed of a metal (conductive) member such as steel or stainless steel from the viewpoint of strength. The material of the end member 400 is not particularly limited, and may be formed of a high-strength insulating member or may be subjected to an insulating treatment. The end member 400 is an example of a lateral member disposed lateral to the energy storage device 100.

The side plate 700 is a long and flat plate-shaped restraining member (restraint bar) having both ends attached to the end members 400 for restraining the plurality of energy storage devices 100. That is, the side plate 700 is disposed extending in the Y-axis direction so as to straddle the plurality of energy storage devices 100 and the plurality of spacers 200 and 300, for applying a restraining force in the arrangement direction of these (Y-axis direction) with respect to the plurality of energy storage devices 100 and the plurality of spacers 200 and 300. In the present embodiment, on both sides of the plurality of energy storage devices 100 in the X-axis direction, two side plates 700 are arranged at positions sandwiching the insulators 600 with the energy storage devices 100 (specifically, case second surfaces 111a described later). Each of the two side plates 700 is attached to the end portions of the two end members 400 in the X-axis direction at both ends in the Y-axis direction. Accordingly, the two side plates 700 sandwich and restrain the plurality of energy storage devices 100 and the plurality of spacers 200 and 300 from both sides in the X-axis direction and both sides in the Y-axis direction.

The side plate 700 is fixed to the end member 400 by a plurality of fixing members 701 arranged in the Z-axis direction. In the present embodiment, the fixing member 701 is a bolt that penetrates the side plate 700 and is joined to the end member 400. The attachment of the side plate 700 to the end member 400 is not limited to fixing with the bolt, and may be joint by welding, adhesion, or the like. Like the end member 400, the side plate 700 is a conductive member formed of a metal (conductive) member such as steel or stainless steel from the viewpoint of strength, but may be formed of a high-strength insulating member, or may be subjected to an insulating treatment. The side plate 700 is an example of a conductive member that sandwiches an insulating member with the energy storage device 100, or an outer portion that is disposed outside a pressing member that presses the energy storage device 100. The detailed description of a configuration of the side plate 700 will be given later.

The insulator 600 is a long and flat plate-shaped insulating member that is disposed on both sides of the plurality of energy storage devices 100 in the X-axis direction and extended in the Y-axis direction. That is, the insulator 600 is disposed between the plurality of energy storage devices 100 and the plurality of spacers 200 and 300 and the side plate 700 so as to straddle the plurality of energy storage devices 100 and the plurality of spacers 200 and 300, and insulates the energy storage devices 100 from the side plate 700. The insulator 600 is formed of an insulating material, such as polycarbonate (PC), polypropylene (PP), polyethylene (PE), polyphenylene sulfide resin (PPS), polyethylene terephthalate (PET), polyether ether ketone (PEEK), tetrafluoroethylene/perfluoroalkyl vinyl ether (PFA), polytetrafluoroethylene (PTFE), polybutylene terephthalate (PBT), poly ether sulfone (PES), ABS resin, ceramics, and composite materials thereof. The insulator 600 may be formed of any material as long as it is an insulating member, and the two insulators 600 may be formed of members of different materials.

The insulator 600 also has a function of pressing the plurality of energy storage devices 100 in the Z-axis minus direction. That is, the plurality of energy storage devices 100 have a configuration in which they are placed on a cooling device 20 (see FIG. 10) and cooled, and the insulator 600 presses the plurality of energy storage devices 100 toward the cooling device 20. The cooling device 20 is a device that cools the energy storage apparatus 10 (the plurality of energy storage devices 100) by water cooling, for example. The energy storage apparatus 10 has a configuration in which the energy storage apparatus 10 is mounted not on the cooling device 20 but on the vehicle body of the automobile on which the energy storage apparatus 10 is mounted, or on an outer case or the like that houses the energy storage apparatus 10. The insulator 600 may be configured to press the plurality of energy storage devices 100 toward the vehicle body, the outer case, or the like. The insulator 600 is an example of an inside part disposed in the inside of a first insulating member disposed on the X-axis direction side of the energy storage device 100, an abutting member that abuts on the energy storage device 100, or the pressing member that presses the energy storage device 100. The detailed description of a configuration of the insulator 600 will be given later.

The bus bar 800 is a conductive plate-shaped member that is disposed on the plurality of energy storage devices 100 for electrically connecting the electrode terminals of the plurality of energy storage devices 100. In the present embodiment, the bus bar 800 connects the plurality of energy storage devices 100 in series by connecting positive electrode terminals and negative electrode terminals of the adjacent energy storage devices 100 in order. The external terminals 810 for the positive and negative electrodes are connected to the bus bar 800 disposed at the end portions. The bus bar 800 is formed of a conductive member made of metal such as copper, copper alloy, aluminum, aluminum alloy. The connection mode of the energy storage device 100 is not particularly limited, and any of the energy storage devices 100 may be connected in parallel.

The bus bar holding member 900 is a plate-shaped member (busbar plate, busbar frame) that holds the bus bar 800 and other wirings (not shown), and can insulate the bus bar 800 and the like from the other members and regulate the position of the bus bar 800 and the like. Specifically, the bus bar holding member 900 has a main body portion and a lid portion, and is configured capable of housing the bus bar 800 and the like by opening the lid portion and placing the bus bar 800 and the like on the main body portion, and then closing the lid portion. The bus bar holding member 900 is formed of an insulating material such as PC, PP, PE, PPS, PET, PEEK, PFA, PTFE, PBT, PES, ABS resin, ceramics, and composite materials thereof.

[2 Detailed Description of Energy Storage Device 100]

Figure 3:
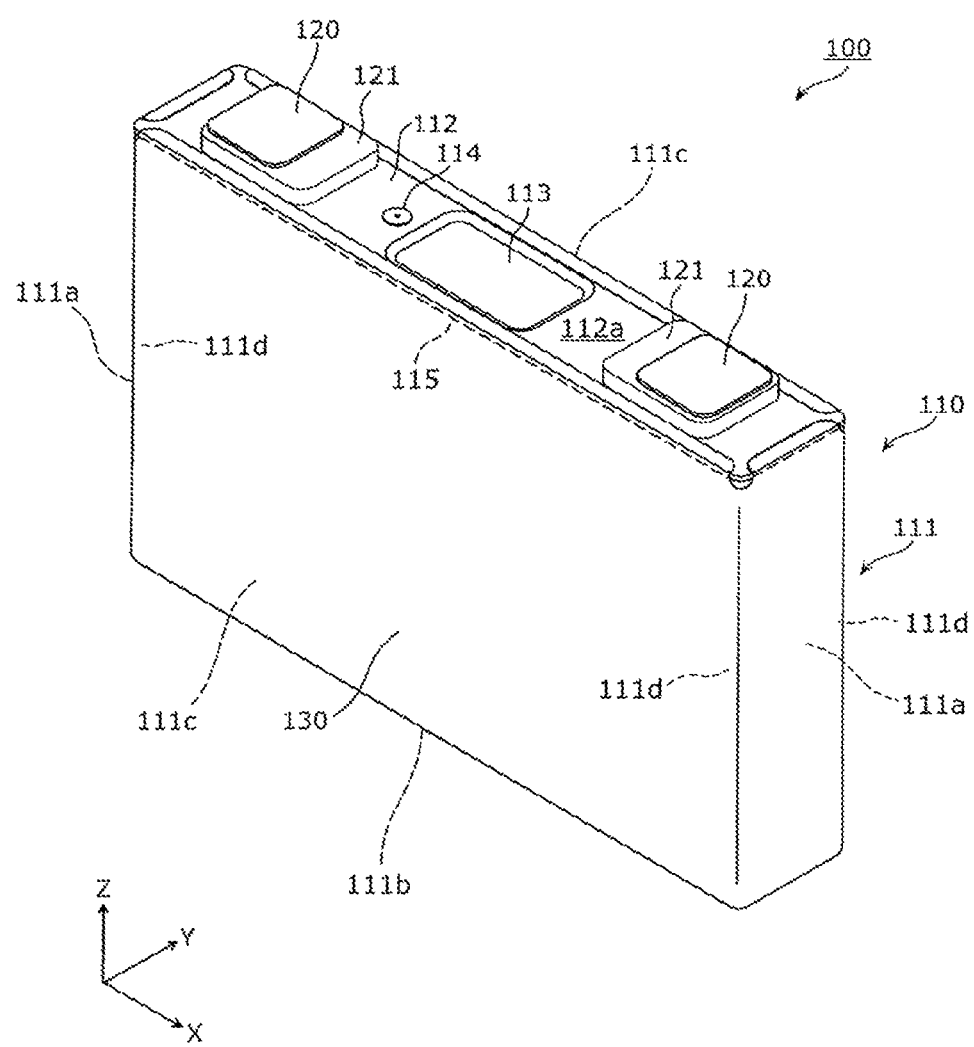
FIG. 3 is a perspective view showing a configuration of an energy storage device according to the embodiment.

Next, the configuration of the energy storage device 100 is described in detail. FIG. 3 is a perspective view showing the configuration of the energy storage device 100 according to the present embodiment.

As shown in FIG. 3, the energy storage device 100 includes a case 110, two electrode terminals 120 (a positive electrode terminal and a negative electrode terminal), two gaskets 121, and an insulating sheet 130. Inside the case 110, an electrode assembly, a current collector (a positive electrode current collector and a negative electrode current collector), an electrolytic solution (non-aqueous electrolyte), and the like are housed, but they are not shown. The electrolytic solution is not particularly limited in type as long as it does not impair the performance of the energy storage device 100, and various electrolytic solutions can be selected. The gasket is also disposed between the case 110 (lid body 112 described later) and the current collector, and spacers are arranged at the sides of the current collector, but these are not shown.

The case 110 is a rectangular parallelepiped (square) case having a case main body 111 having an opening formed therein and a lid body 112 closing the opening of the case main body 111. The lid body 112 is a rectangular plate-shaped member that constitutes a lid portion of the case 110, and is disposed on the Z-axis plus direction side of the case main body 111. The lid body 112 has a case first surface 112$a$ on which the electrode terminals 120 are arranged. The case first surface 112$a$ is a rectangular flat surface (outer surface or upper surface) disposed on the Z-axis plus direction side of the lid body 112 and extending in the X-axis direction. The lid body 112 is also provided with a gas release valve 113 that, when a pressure inside the case 110 rises, releases the pressure, a liquid injection part 114 for injecting an electrolytic solution into the inside of the case 110, and the like.

The case main body 111 is a bottomed member constituting a main body portion of the case 110 and having a rectangular tubular shape, has two case second surfaces 111$a$ on both side surfaces in the X-axis direction, has a case third surface 111$b$ on the Z-axis minus direction side, and has two case fourth surfaces 111$c$ on both side surfaces in the Y-axis direction. The case second surface 111a is a rectangular flat surface that forms a short side surface of the case 110. In other words, the case second surface 111a is a surface adjacent to the case first surface 112a, the case third surface 111b, and the case fourth surface 111c and having a smaller area than the case fourth surface 111c. The case third surface 111b is a rectangular flat surface that forms the bottom surface of the case 110. In other words, the case third surface 111b is a surface facing the case first surface 112a and adjacent to the case second surface 111a and the case fourth surface 111c. The case fourth surface 111c is a rectangular flat surface that forms a long side surface of the case 110. In other words, the case fourth surface 111c is a surface adjacent to the case first surface 112a, the case second surface 111a, and the case third surface 111b, and having a larger area than the case second surface 111a. The case main body 111 has a curved case corner portion 111d at a boundary portion between the case second surface 111a and the case fourth surface 111c. The case corner portion 111d is a corner disposed between the two side surfaces, that is, between the long side surface (case fourth surface 111c) and the short side surface (case second surface 111a) of the case 110 of the energy storage device 100.

With such a configuration, the case 110 is configured such that after the electrode assembly and the like are housed inside the case main body 111, the case main body 111 and the lid body 112 are joined by welding or the like to form a joint 115, and thereby the inside is sealed. That is, on the side surfaces of the case 110 (the surfaces on both sides in the X-axis direction and both sides in the Y-axis direction), the joints 115, in which the case main body 111 and the lid body 112 are joined, are formed. The material of the case 110 (the case main body 111 and the lid body 112) is not particularly limited, but is preferably a weldable (joinable) metal such as stainless steel, aluminum, aluminum alloy, iron, and plated steel plate.

The electrode terminals 120 are terminals (a positive electrode terminal and a negative electrode terminal) of the energy storage device 100 disposed on the case first surface 112a of the case 110, and are electrically connected to the positive electrode plate and the negative electrode plate of the electrode assembly through the current collector, respectively. That is, the electrode terminal 120 is a metal member for leading the electricity stored in the electrode assembly to the external space of the energy storage device 100, and for introducing the electricity into the internal space of the energy storage device 100 to store the electricity in the electrode assembly. The electrode terminal 120 is formed of aluminum, aluminum alloy, copper, copper alloy, or the like.

The gasket 121 is a member disposed around the electrode terminal 120 and between the electrode terminal 120 and the lid body 112 of the case 110 for ensuring insulation and airtightness between the electrode terminal 120 and the case 110. The gasket 121 is formed of an insulating material such as PP, PE, PPS, PET, PEEK, PFA, PTFE, PBT, PES, and ABS resin.

The electrode terminal 120 and the gasket 121 are convex portions protruding from the case first surface 112a of the case 110. That is, the electrode terminal 120 or the gasket 121 is an example of a convex portion of the energy storage device 100, and the energy storage device 100 has the two convex portions on both sides of the case first surface 112a in the X-axis direction. In the present embodiment, the energy storage device 100 has the gasket 121 as the convex portion.

The electrode assembly is an energy storage element (power generating element) formed by stacking a positive electrode plate, a negative electrode plate, and a separator. The positive electrode plate included in the electrode assembly has a positive active material layer formed on a positive electrode substrate layer, which is a long strip-shaped current collector foil made of a metal such as aluminum or an aluminum alloy. The negative electrode plate has a negative active material layer formed on a negative electrode substrate layer which is a long strip-shaped current collector foil made of a metal such as copper or a copper alloy. As the positive active material used for the positive active material layer and the negative active material used for the negative active material layer, known materials can be appropriately used as long as they can store and release lithium ions. The current collector is a member (a positive electrode current collector and a negative electrode current collector) having electrical conductivity and rigidity, which is electrically connected to the electrode terminal 120 and the electrode assembly. The positive electrode current collector is formed of aluminum or an aluminum alloy as in the positive electrode substrate layer of the positive electrode plate, and the negative electrode current collector is formed of copper or a copper alloy as in the negative electrode substrate layer of the negative electrode plate.

The insulating sheet 130 is an insulating sheet-like member that is disposed on the outer surface of the case 110 and covers the outer surface of the case 110. As the material of the insulating sheet 130, it is not particularly limited as long as it can ensure the insulation required for the energy storage device 100, but an insulating resin such as PC, PP, PE, PPS, PET, PBT or ABS resin, an epoxy resin, Kapton, Teflon (registered trademark), silicone, polyisoprene, polyvinyl chloride and the like can be exemplified.

Specifically, the insulating sheet 130 is one insulating sheet disposed so as to cover the entire surface of the case third surface 111b of the case 110, almost the entire surface of the case second surface 111a and the case fourth surface 111c, and a part of the case first surface 112a. In this way, the insulating sheet 130 is disposed on the outer surface of the case 110 with the gas release valve 113 of the lid body 112, the liquid injection part 114, and the electrode terminals 120 exposed. The insulating sheet 130 is an example of a second insulating member that covers the case third surface 111b.

[3 Detailed Description of Spacer 200]

Figure 4:
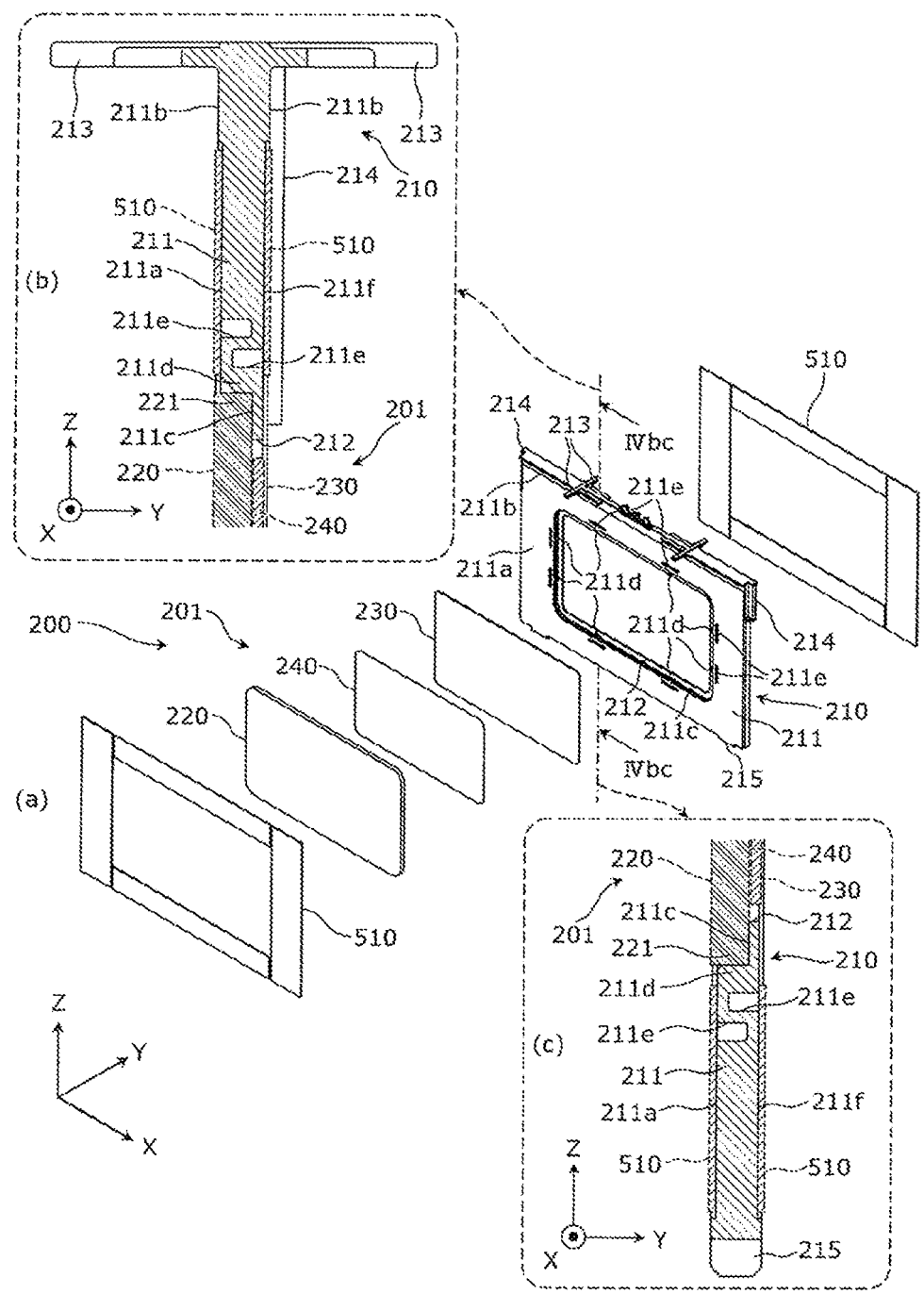
FIG. 4 is a perspective view and a cross-sectional view showing a configuration of a spacer (intermediate spacer) according to the embodiment.

Next, the configuration of the spacer 200 is described in detail. FIG. 4 is a perspective view and a cross-sectional view showing the configuration of the spacer 200 according to the present embodiment. Specifically, FIG. 4(a) is a perspective view showing the spacer 200 in a disassembled state and each component together with the joining member 510. FIG. 4(b) is a cross-sectional view showing the configuration of the upper portion (a portion on the Z-axis plus direction side) when a second member 210 of the spacer 200 of FIG. 4(a) is cut along an IVbc-IVbc line. FIG. 4(c) is a cross-sectional view showing the configuration of the lower portion (a portion on the Z-axis minus direction side). In FIGS. 4(b) and 4(c), components other than the second member 210 are also indicated by broken lines for convenience of description.

As shown in FIG. 4, the spacer 200 includes a first member 201 and the second member 210. The first member 201 is a member disposed at a position where it abuts on the case fourth surface 111c, which is the side surface (a side surface on the Y-axis direction side) of the energy storage device 100 facing in the Y-axis direction, and includes a first plate portion 220, a second plate portion 230, and a joining member 240 that joins the first plate portion 220 and the second plate portion 230. The second member 210 is a member that is disposed on a side of the first member 201 in a direction intersecting the Y-axis direction and supports the end portion of the first member 201 in a direction intersecting the Y-axis direction. Specifically, it is configured such that at the central position of the second member 210, an opening 212, which is a rectangular through hole penetrating in the Y-axis direction, is formed, and the first member 201 is disposed in the opening 212, and thus, the second member 210 supports the periphery of the first member 201.

Figure 10:
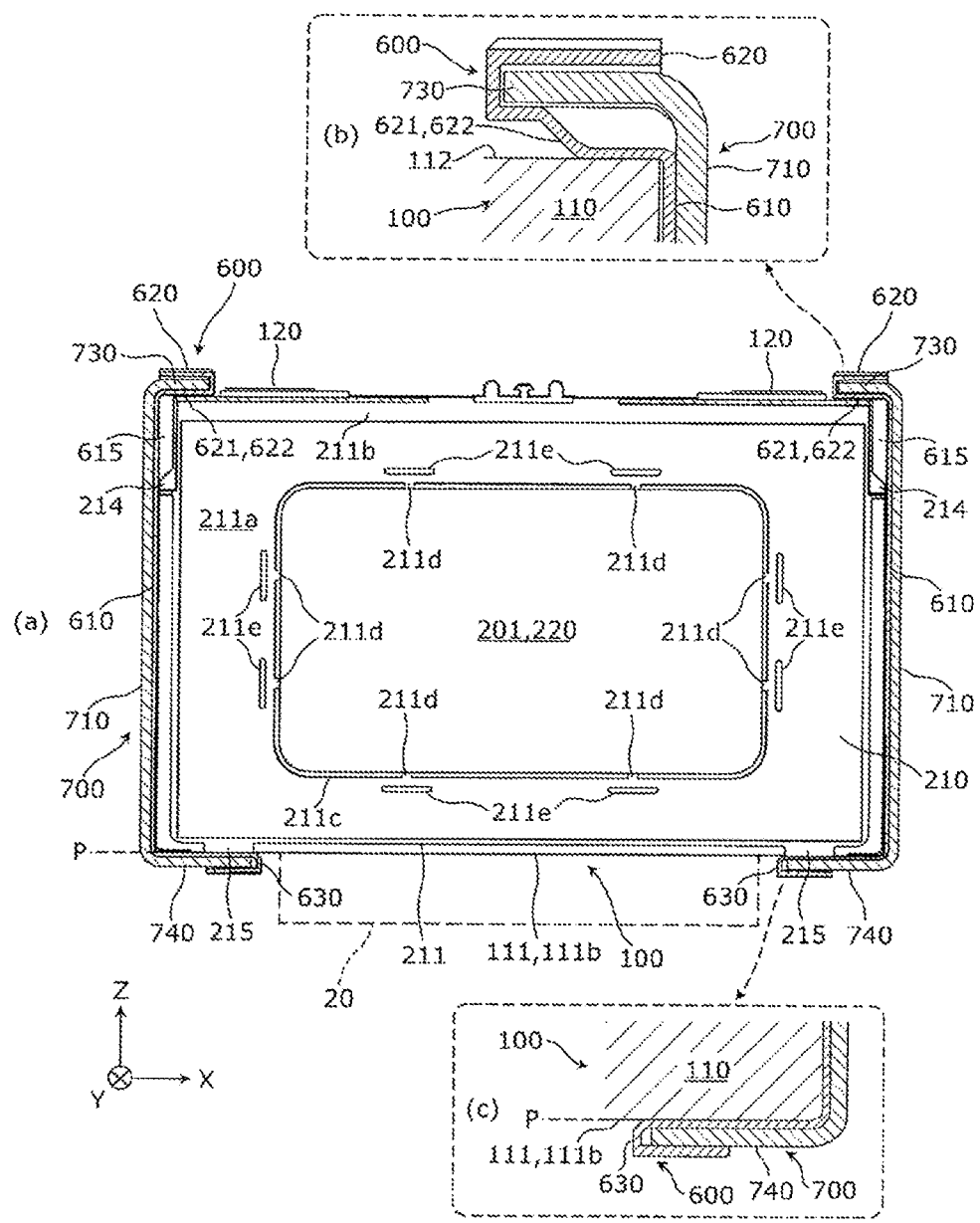
FIG. 10 is a cross-sectional view showing a positional relationship among the energy storage device, the spacer, the insulator, and the side plate according to the embodiment.

More specifically, as shown in FIG. 10 described later, the second member 210 includes a main body portion 211, a first protrusion 213, a second protrusion 214, and a third protrusion 215. The main body portion 211 is a rectangular ring-shaped and plate-shaped portion in which the above-described opening 212 is formed at the central position. The main body portion 211 is provided with a spacer first surface 211a, a joint protrusion 211b, a first concave portion 211c, a sandwiching part 211d, a second concave portion 211e, and a spacer second surface 211f.

The spacer first surface 211a is an annular flat surface that is disposed on the Y-axis minus direction side of the main body portion 211 and around the opening 212, and the joining member 510 on the Y-axis minus direction side is disposed thereon. That is, four rectangular joining members 510 are arranged on the spacer first surface 211a, and the spacer 200 and the energy storage device 100 on the Y-axis minus direction side are joined together. The spacer second surface 211f is an annular flat surface disposed on the opposite side of the spacer first surface 211a (Y-axis plus direction side) and around the opening 212, and the joining member 510 on the Y-axis plus direction side is disposed thereon. That is, four rectangular joining members 510 are arranged on the spacer second surface 211f, and the spacer 200 and the energy storage device 100 on the Y-axis plus direction side are joined together.

The joining member 510 is a member that is disposed between the energy storage device 100 and the spacer 200 and joins the energy storage device 100 and the spacer 200, and is an adhesive layer such as a double-sided tape in the present embodiment. The joining member is not limited to the double-sided tape, and may be an adhesive layer such as an adhesive, and a welded portion when joined by welding, a welded portion when joined by welding, mechanically joined portion by caulking, fitting, or the like, or another joined portion.

The joint protrusion 211b is a protruding portion that is long in the X-axis direction and is disposed so as to protrude from the spacer first surface 211a and the spacer second surface 211f to both sides in the Y-axis direction, and is disposed so as to face the joints 115 of the cases 110 of the energy storage devices 100 on both sides in the Y-axis direction. Specifically, the joint protrusion 211b is disposed at a position where it abuts on the joint 115 of the case 110 of the energy storage device 100 when the energy storage device 100 is disposed adjacent to the spacer 200. That is, the joint protrusion 211b abuts on the joint 115 at the time of manufacturing the energy storage apparatus 10, or abuts on the joint 115 when the case 110 of the energy storage device 100 swells while the energy storage apparatus 10 is in use.

The first concave portion 211c is an annular concave portion formed along the periphery of the opening 212 and recessed in the Y-axis plus direction. That is, the second member 210 has the first concave portion 211c at the end portion along the opening 212, and the first member 201 engages with the first concave portion 211c in the Y-axis direction. Specifically, the first concave portion 211c engages with the engaging part 221 disposed at the end portion of the first plate portion 220 of the first member 201, so that the first member 201 is disposed with respect to the second member 210. A configuration may be adopted in which the first member 201 has a first concave portion, and the second member 210 has an engaging part that engages with the first concave portion. That is, one of the first member 201 and the second member 210 may have the first concave portion at the end portion, and the other may have the engaging part 221 that engages with the first concave portion in the Y-axis direction.

The sandwiching part 211d is a protrusion that protrudes from the inner wall of the first concave portion 211c toward the inside of the opening 212, and has a function of sandwiching the first member 201. In the present embodiment, a total of eight sandwiching parts 211d are provided on both sides in the X-axis direction and both sides in the Z-axis direction of the first member 201. That is, two pairs of sandwiching parts 211d sandwich the first member 201 in the X-axis direction, and two pairs of sandwiching parts 211d sandwich the first member 201 also in the Z-axis direction. Specifically, the sandwiching part 211d sandwiches the first member 201 in the X-axis direction and the Z-axis direction by engaging with the end surfaces on both sides in the X-axis direction and both sides in the Z-axis direction of the first member 201. The shape, number, and arrangement positions of the sandwiching parts 211d are not limited to the above.

The second concave portions 211e are concave portions recessed in the Y-axis direction from the spacer first surface 211a and the spacer second surface 211f, are arranged lateral to the first member 201, and are formed in a long shape along the periphery of the first member 201. Specifically, the second concave portions 211e are arranged at positions adjacent to the sandwiching parts 211d in the spacer first surface 211a, and are arranged inside (on the first member 201 side) of the second concave portion 211e formed in the spacer first surface 211a in the spacer second surface 211f. The shape, number and arrangement positions of the second concave portions 211e are not limited to the above. Instead of the second concave portion 211e, a through hole that is disposed lateral to the first member 201 and penetrates the main body portion 211 in the Y-axis direction may be formed.

With such a configuration, the sandwiching parts 211d and the second concave portions 211e are arranged within the range from the spacer first surface 211a to the spacer second surface 211f in the Y-axis direction. That is, the sandwiching parts 211d and the second concave portions 211e are formed without a shape protruding from the spacer first surface 211a in the Y-axis minus direction, and without a shape protruding from the spacer second surface 211f in the Y-axis plus direction. In other words, the spacer first surface 211a and the spacer second surface 211f are recessed or formed in the same plane as adjacent surfaces at positions overlapping the sandwiching parts 211d when viewed in the Y-axis direction. Similarly, the spacer first surface 211a and the spacer second surface 211f are recessed or formed in the same plane as adjacent surfaces at positions overlapping the second concave portions 211e when viewed in the Y-axis direction.

The first protrusion 213 is a long-shaped protruding portion that protrudes toward both sides in the Y-axis direction from the end portion of the main body portion 211 on the Z-axis plus direction side. In the present embodiment, two pairs of first protrusions 213 are arranged side by side in the X-axis direction. The first protrusion 213 is disposed so as to face a convex portion (gasket 121 in the present embodiment) of the energy storage device 100 on the X-axis direction side and protrude along the convex portion. The detailed description of this will be given later.

The second protrusions 214 are protruding portions that protrude from portions on both sides in the X-axis direction and on the Z-axis plus direction side of the main body portion 211 to both sides in the X-axis direction. The second protrusion 214 has a concave-convex portion having at least one of a concave portion and a convex portion formed at the end portion in the X-axis direction. Specifically, the concave-convex portion has a convex portion 214a protruding in the Y-axis plus direction, and a concave portion 214b formed on the back side of the convex portion 214a and recessed in the surface of the end portion of the second protrusion 214 (see FIG. 8). The second protrusions 214 extend in the Z-axis direction, and the concave-convex portions (convex portion 214a and concave portion 214b) also extend in the Z-axis direction. The detailed description of this will be given later.

The third protrusion 215 is a protruding portion that protrudes from the end portion of the main body portion 211 on the Z-axis minus direction side to the Z-axis minus direction side, which is the direction toward the bottom surface (case third surface 111b) side of the energy storage device 100. The third protrusions 215 are arranged at both end portions of the main body portion 211 in the X-axis direction, and are placed on the insulator 600. The detailed description of this will be given later.

The second member 210 is formed of an insulating material such as PC, PP, PE, PPS, PET, PEEK, PFA, PTFE, PBT, PES, ABS resin, and a composite material thereof. The second member 210 may be formed of any material as long as it has an insulating property, and all the second members 210 of the plurality of spacers 200 may be formed of members made of the same material, or any of the second members 210 may be formed of members made of different materials.

The first member 201 is formed of a member having higher heat resistance than the second member 210. Preferably, the first member 201 is formed of a member having higher hardness than the second member 210. More preferably, the first member 201 is formed of a member having higher heat insulating property than the second member 210. As the first plate portion 220 and the second plate portion 230 constituting the first member 201 and having high heat resistance and the like, mica plates formed by a dammar material constituted by accumulating and bonding mica pieces (thermal decomposition temperature is, for example, about 600° C. to 800° C.) and the like can be cited. The first plate portion 220 and the second plate portion 230 may be formed of any material as long as it is a member having high heat resistance and the like, and the first plate portion 220 and the second plate portion 230 may be formed of different materials. Since the material and the like of the joining member 240 are the same as the material and the like of the joining member 510, detailed description thereof will be omitted.

High heat resistance means that it is not easily affected even when exposed to high temperatures, and can maintain physical properties (or maintain shape), and means that it has, for example, a high glass transition temperature, a high deflection temperature under load (heat distortion temperature), or a high melting point. When the glass transition temperature, the deflection temperature under load (heat distortion temperature), and the melting point are compared for two members, and if there are numerical values that are reversed, the member with higher melting point is defined as the member with higher heat resistance. High hardness means that it is hard and difficult to be deformed, for example, it has high Vickers hardness. High heat insulating property means that it is difficult to transfer heat, and means that it has, for example, a low thermal conductivity. The comparison of these heat resistance and the like (heat resistance, hardness and heat insulating property) can be made by appropriately measuring by a known method.

In the above-described embodiment, the first plate portion 220 and the second plate portion 230 are all formed of a member having high heat resistance and the like, but a part thereof may be formed of a member having high heat resistance and the like. The first plate portion 220 and the second plate portion 230 may form a member having high heat resistance and the like by a configuration in which a member (paint or the like) having high heat resistance and the like is disposed (applied) on the surface of a resin substrate.

Specifically, the first plate portion 220 and the second plate portion 230 are, when the energy storage device 100 is disposed adjacent to the spacer 200, rectangular and flat-plate members arranged at positions abutting on the case fourth surface 111c of the energy storage device 100. That is, the first plate portion 220 and the second plate portion 230 abut on the case fourth surface 111c at the time of manufacturing the energy storage apparatus 10, or abut on the case fourth surface 111c when the case 110 of the energy storage device 100 swells while the energy storage apparatus 10 is in use. The first plate portion 220 is formed to have larger widths in the X-axis direction and the Z-axis direction and a larger thickness in the Y-axis direction than the second plate portion 230.

More specifically, the first plate portion 220 is disposed so as to protrude from the spacer first surface 211a toward the energy storage device 100 on the Y-axis minus direction side, and face the central portion of the energy storage device 100 on the Y-axis minus direction side. The second plate portion 230 is disposed on the opposite side (Y-axis plus direction side) of the first plate portion 220. That is, the second plate portion 230 is disposed so as to protrude from the spacer second surface 211f toward the energy storage device 100 on the Y-axis plus direction side and face the central portion of the energy storage device 100 on the Y-axis plus direction side. The first plate portion 220 is disposed so as to protrude to the Y-axis minus direction side relative to the joint protrusion 211b on the Y-axis minus direction side, and the second plate portion 230 is disposed so as to be recessed in the Y-axis minus direction relative to the joint protrusion 211b on the Y-axis plus direction side. As described above, the first member 201 is formed to have substantially the same thickness as a thickness of the main body portion 211 of the second member 210, or have a larger thickness than the thickness of the main body portion 211.

The first plate portion 220 is an example of a central protruding portion, and the central protruding portion (first plate portion 220) and the joint protrusion 211b on the Y-axis minus direction side are an example of a first protruding portion. The second plate portion 230 is also an example of a central protruding portion, and the central protruding portion (second plate portion 230) and the joint protrusion 211b on the Y-axis plus direction side are an example of a second protruding portion. Therefore, the central protruding portion preferably has higher heat resistance and higher hardness than the second member 210, and more preferably has higher heat insulating property. In other words, each of the first protruding portion and the second protruding portion has a portion having higher heat resistance than the portion having the spacer first surface 211a and the spacer second surface 211f of the spacer 200, also preferably has a portion having high hardness, and more preferably has a portion having high heat insulating property.

[4 Detailed Description of Spacer 300]

Figure 5:
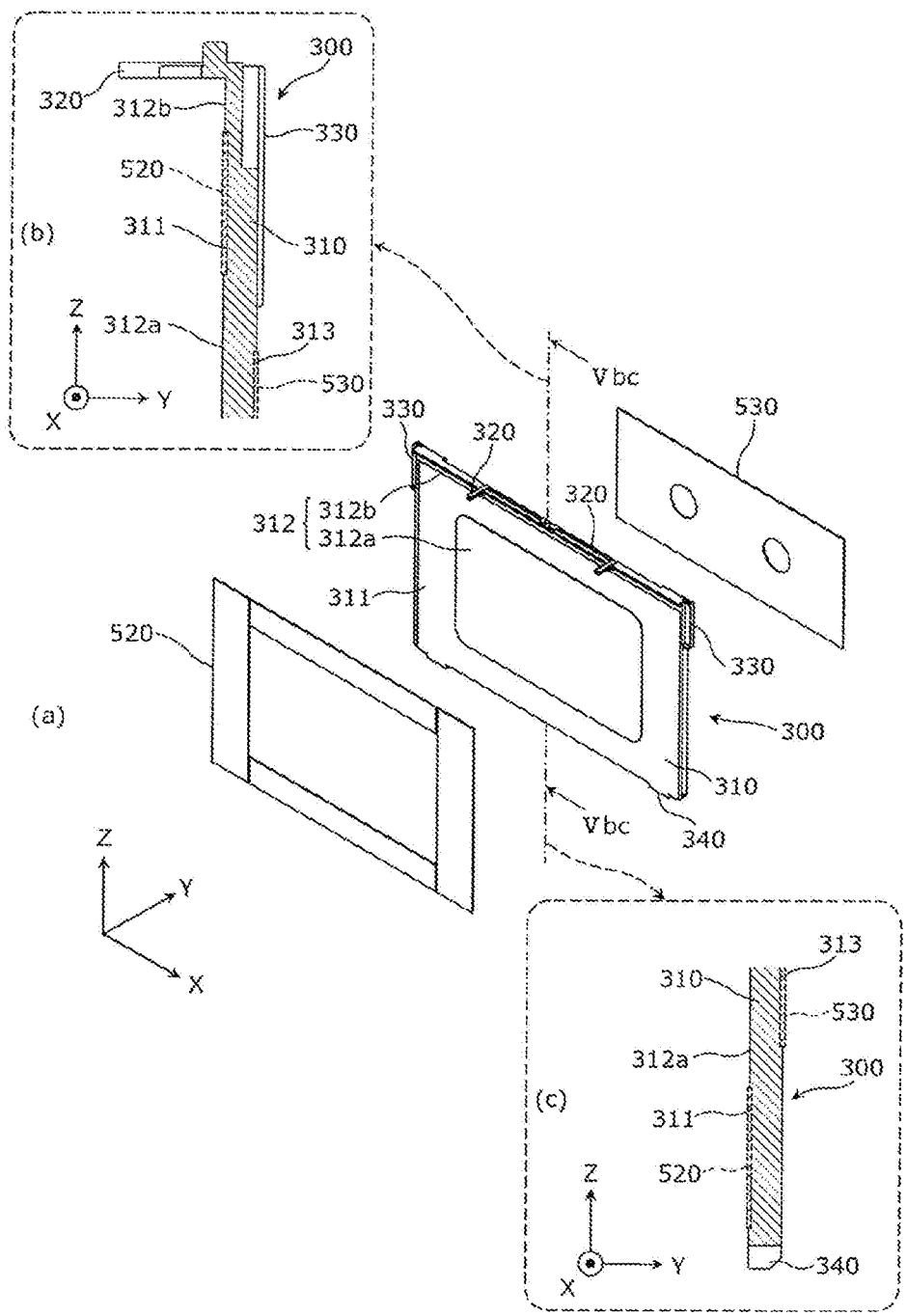
FIG. 5 is a perspective view and a cross-sectional view showing a configuration of a spacer (end spacer) according to the embodiment.

Next, the configuration of the spacer 300 is described in detail. FIG. 5 is a perspective view and a cross-sectional view showing the configuration of the spacer 300 according to the present embodiment. Specifically, FIG. 5(a) is a perspective view showing the spacer 300 on the Y-axis plus direction side in FIG. 2 together with the joining members 520 and 530. FIG. 5(b) is a cross-sectional view showing the configuration of the upper portion (a portion on the Z-axis plus direction side) when the spacer 300 of FIG. 5(a) is cut along a line Vbc-Vbc, and FIG. 5(c) is a cross-sectional view showing the configuration of the lower portion (a portion on the Z-axis minus direction side). In FIGS. 5(b) and 5(c), the joining members 520 and 530 are also indicated by broken lines for convenience of description. The spacer 300 on the Y-axis minus direction side in FIG. 2 also has the same configuration.

As shown in FIG. 5, the spacer 300 includes a main body portion 310, a first protrusion 320, a second protrusion 330, and a third protrusion 340. The main body portion 310 is a rectangular and plate-shaped portion, and is provided with a spacer first surface 311, a first protruding portion 312 having a central protruding portion 312a and a joint protrusion 312b, and a spacer second surface 313. The spacer 300 is formed of the same material as the second member 210 of the spacer 200.

The spacer first surface 311 is an annular flat surface that is disposed on the Y-axis minus direction side of the main body portion 310 and around the central protruding portion 312a, and the joining member 520 is disposed thereon. That is, four rectangular joining members 520 are arranged on the spacer first surface 311 to join the spacer 300 and the energy storage device 100 on the Y-axis minus direction side. The spacer second surface 313 is a rectangular flat surface disposed on the opposite side (Y-axis plus direction side) of the central protruding portion 312a, and the joining member 530 is disposed thereon. That is, the rectangular joining member 530 is disposed on the spacer second surface 313 to join the spacer 200 and the energy storage device 100 on the Y-axis plus direction side.

The joining member 520 is a member that is disposed between the energy storage device 100 and the spacer 300 to join the energy storage device 100 and the spacer 300, and the joining member 530 is a member that is disposed between the end member 400 and the spacer 300 to join the end member 400 and the spacer 300. Since the materials and the like of the joining members 520 and 530 are the same as the materials and the like of the joining member 510, detailed description thereof will be omitted.

The central protruding portion 312a of the first protruding portion 312 is a portion disposed so as to protrude from the spacer first surface 311 toward the energy storage device 100 on the Y-axis minus direction side, and face the central portion of the energy storage device 100 on the Y-axis minus direction side. The joint protrusion 312b is a protruding portion that is long in the X-axis direction and is disposed so as to protrude from the spacer first surface 311 to the Y-axis minus direction side, and is disposed so as to face the joint 115 of the case 110 of the energy storage device 100 on the Y-axis minus direction side. Specifically, the central protruding portion 312a and the joint protrusion 312b, when the energy storage device 100 is disposed adjacent to the spacer 300, are arranged at positions abutting on the case fourth surface 111c and the joint 115 of the case 110 of the energy storage device 100. That is, the central protruding portion 312a and the joint protrusion 312b abut on the case fourth surface 111c and the joint 115 at the time of manufacturing the energy storage apparatus 10, or abut on the case fourth surface 111c and the joint 115 when the case 110 of the energy storage device 100 swells while the energy storage apparatus 10 is in use. The joint protrusion 312b protrudes in the Y-axis minus direction to the same position as the central protruding portion 312a.

The first protrusion 320 is a long-shaped protruding portion that protrudes from the end portion of the main body portion 310 on the Z-axis plus direction side to the Y-axis minus direction side. Since the first protrusion 320 has the same configuration as the first protrusion 213 of the spacer 200, detailed description thereof will be omitted.

The second protrusions 330 are protruding portions that protrude from portions on both sides in the X-axis direction and on the Z-axis plus direction side of the main body portion 310 to both sides in the X-axis direction. The second protrusion 330 has a concave-convex portion having at least one of a concave portion and a convex portion formed at the end portion in the X-axis direction. Specifically, the concave-convex portion has concave portions 331 and 332 recessed in the surfaces at the end portions of the second protrusion 330 (see FIG. 8). Since the second protrusion 330 extends in the Z-axis direction, the concave-convex portions (concave portions 331 and 332) also extend in the Z-axis direction. The detailed description of this will be given later.

The third protrusion 340 is a protruding portion that protrudes from the end portion of the main body portion 310 on the Z-axis minus direction side to the Z-axis minus direction side, which is the direction to the bottom surface (case third surface 111b) side of the energy storage device 100. The third protrusion 340 has the same configuration as the third protrusion 215 of the spacer 200, and thus detailed description thereof will be omitted.

[5 Detailed Description of Insulator 600]

Figure 6:
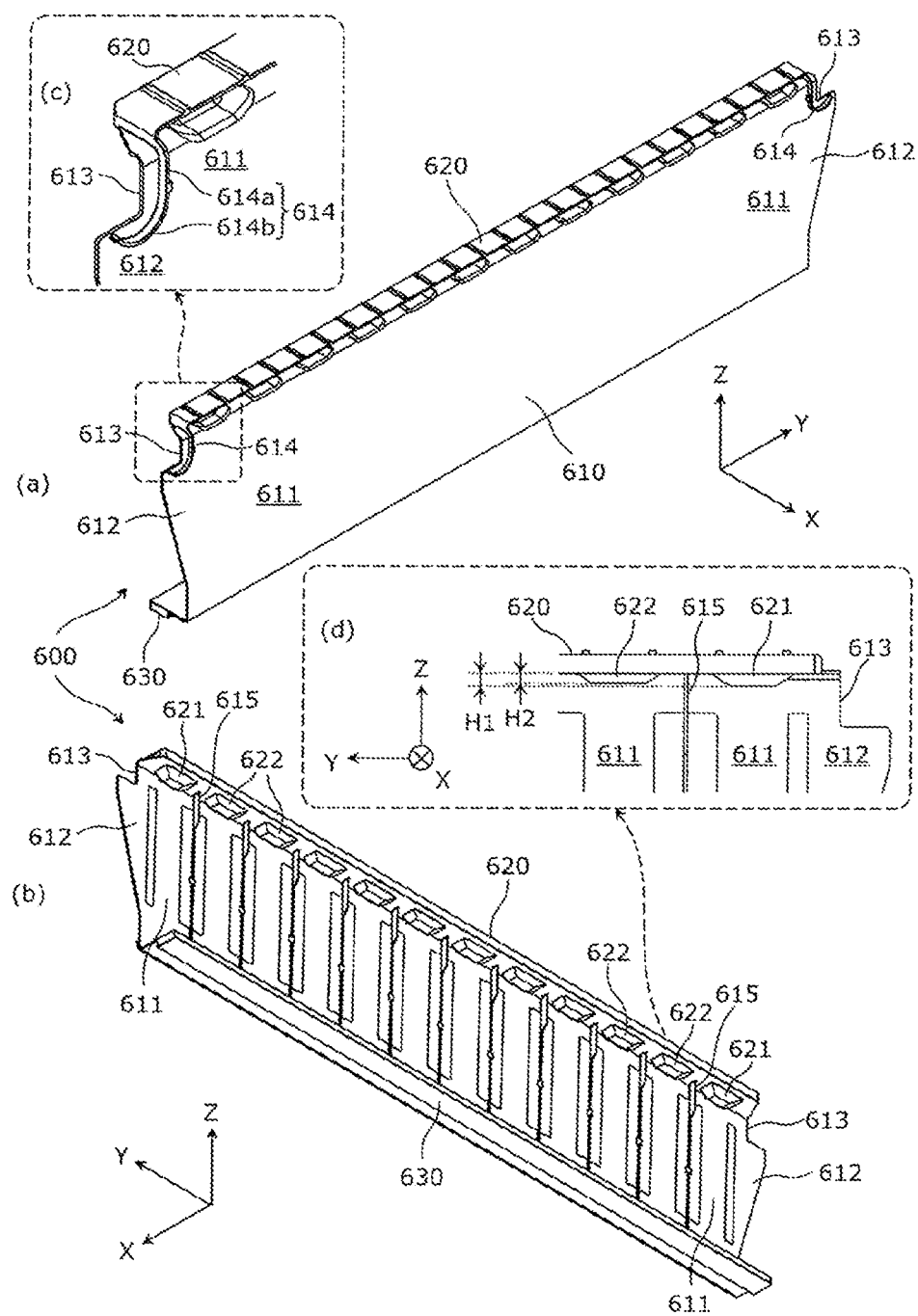
FIG. 6 is a perspective view and a plan view showing a configuration of an insulator according to the embodiment.

Next, the configuration of the insulator 600 will be described in detail. FIG. 6 is a perspective view and a plan view showing the configuration of the insulator 600 according to the present embodiment. Specifically, FIG. 6(a) is a perspective view showing the insulator 600 on the X-axis plus direction side in FIG. 2, and FIG. 6(b) is a perspective view showing the configuration of the insulator 600 of FIG. 6(a) when viewed from the back side. FIG. 6(c) is an enlarged perspective view showing a portion encircled by a broken line in FIG. 6(a) in an enlarged manner. FIG. 6(d) is a plan view showing the configuration of the insulator 600 of FIG. 6(b) when the end portion of the insulator 600 on the Y-axis minus direction side and on the Z-axis plus direction side is seen from the X-axis minus direction side in an enlarged manner. The insulator 600 on the X-axis minus direction side in FIG. 2 also has the same configuration.

As shown in FIG. 6, the insulator 600 includes an insulator main body portion 610, an insulator first wall portion 620, and an insulator second wall portion 630. The insulator main body portion 610 is a rectangular and plate-shaped portion that is disposed on the X-axis plus direction side of the energy storage device 100 and that extends in the Y-axis direction and is parallel to the YZ plane. The insulator first wall portion 620 is a long and plate-shaped portion that protrudes from the end portion of the insulator main body portion 610 on the Z-axis plus direction side to the X-axis minus direction side and is extended in the Y-axis direction, and is disposed on the Z-axis plus direction side of the energy storage device 100. The insulator second wall portion 630 is a long and plate-shaped portion that protrudes from the end portion of the insulator main body portion 610 on the Z-axis minus direction side to the X-axis minus direction side and is extended in the Y-axis direction, and is disposed on the Z-axis minus direction side of the energy storage device 100.

Specifically, the insulator main body portion 610 has a facing portion 611 and an extending portion 612. The facing portion 611 is a rectangular and plate-shaped portion that is disposed on the X-axis direction side of the case second surface 111*a* so as to face the case second surface 111*a* of the energy storage device 100 and that extends in the Y-axis direction and is parallel to the YZ plane. The extending portion 612 is a portion disposed so as to extend in the Y-axis direction from a portion of the facing portion 611 on the electrode terminal 120 side (Z-axis plus direction side) relative to a portion on the opposite side (Z-axis minus direction side) of the electrode terminal 120 of the facing portion 611. In other words, the insulator main body portion 610 has a shape in which portions on the Z-axis plus direction side of the end portions on both sides in the Y-axis direction protrude to both sides in the Y-axis direction.

The extending portion 612 has a concave portion 613 and a rib 614. The concave portion 613 is a notch-shaped concave portion in which the outer edge of the extending portion 612 on the Z-axis minus direction side is recessed in the Z-axis minus direction. The rib 614 is a protruding portion that protrudes from the surface of the extending portion 612, and is disposed so as to surround the concave portion 613. Specifically, the rib 614 has a first rib 614*a* extending in the Z-axis direction and a second rib 614*b* extending in the Y-axis direction along the periphery of the concave portion 613. In the present embodiment, the rib 614 protrudes outward from the outer surface of the extending portion 612, but it may protrude inward from the inner surface of the extending portion 612.

A third rib 615 is provided on the inner surface of the insulator main body portion 610. The third rib 615 is a protruding portion that protrudes inward from the inner surface of the end portion of the facing portion 611 on the Z-axis plus direction side, and is disposed so as to extend in the Z-axis direction. In the present embodiment, a plurality of (eleven) third ribs 615 are arranged side by side at equal intervals in the Y-axis direction.

The insulator first wall portion 620 has first pressing parts 621 and second pressing parts 622 which are a plurality of pressing parts. The plurality of pressing parts (first pressing parts 621 and second pressing parts 622) are arranged corresponding to each of the plurality of energy storage devices 100, are portions that press each of the plurality of energy storage devices 100, and specifically are convex portions that protrude toward the corresponding energy storage devices 100. Specifically, the insulator first wall portion 620 has at least two first pressing parts 621 and a second pressing part 622 as the plurality of pressing parts. In the present embodiment, two first pressing parts 621 are arranged corresponding to the energy storage devices 100 at both end portions of the plurality of energy storage devices 100, and a plurality of (ten) second pressing parts 622 are arranged between the two first pressing parts 621.

Specifically, the first pressing parts 621 and the second pressing parts 622 are convex portions in which the surface of the insulator first wall portion 620 on the Z-axis plus direction side is recessed and the surface of the insulator first wall portion 620 on the Z-axis minus direction side is swollen, and are arranged at equal intervals in the Y-axis direction (alternately arranged with the third ribs 615). The first pressing part 621 is formed so that a protruding height of the convex portion is higher than that of the second pressing part 622. That is, a protruding height H1 of the first pressing part 621 is formed to be larger than a protruding height H2 of the second pressing part 622 (see FIG. 6(*d*)). As a result, the first pressing part 621 presses the corresponding energy storage device 100 with a larger force than the second pressing part 622. The first pressing part 621 may abut on the corresponding energy storage device 100, and the second pressing part 622 may not abut on the corresponding energy storage device 100.

The insulator second wall portion 630 is a portion on which the energy storage device 100 and the spacers 200 and 300 are placed. The detailed description of this will be given later.

[6 Detailed Description of Side Plate 700]

Figure 7:
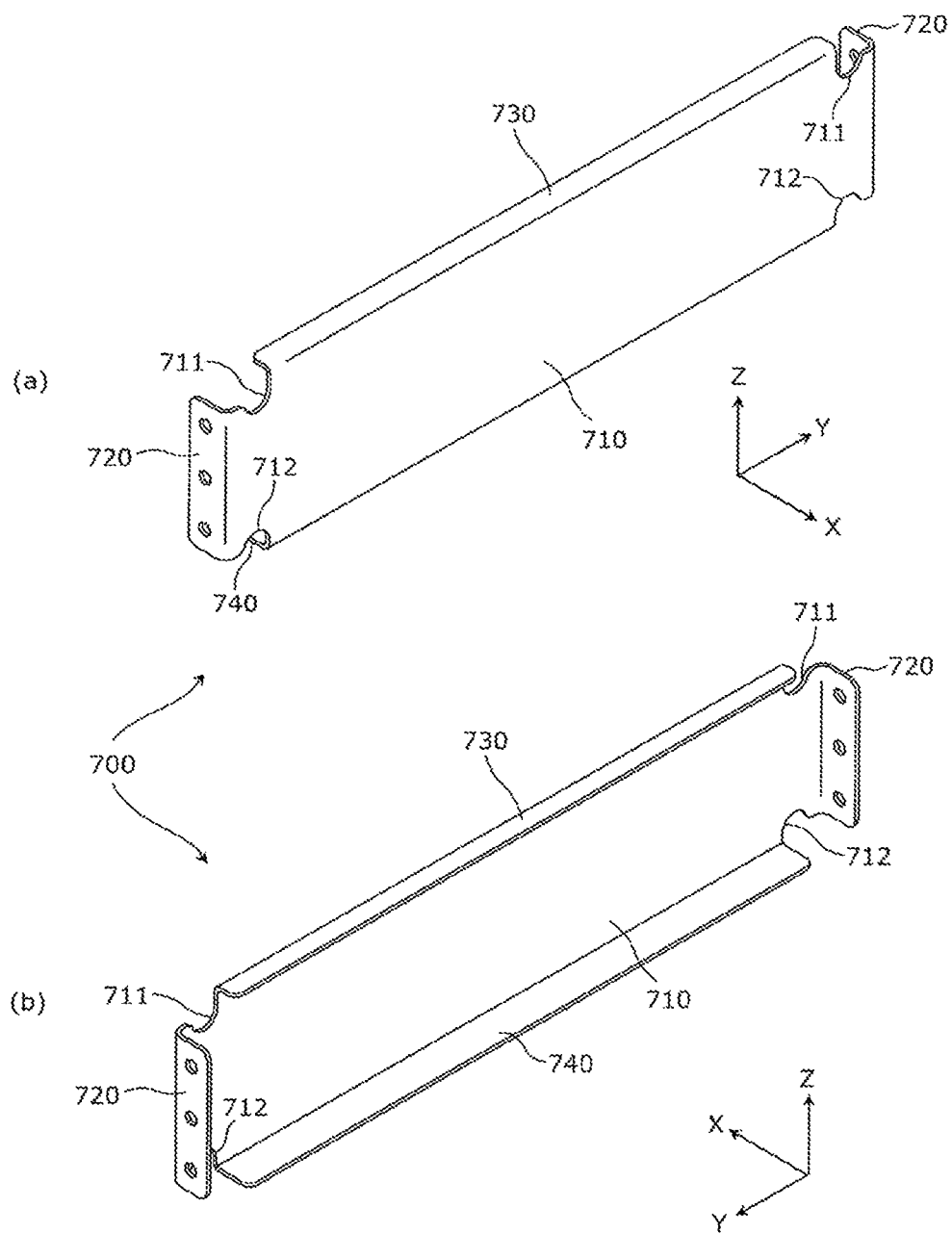
FIG. 7 is a perspective view showing a configuration of a side plate according to the embodiment.

Next, the configuration of the side plate 700 will be described in detail. FIG. 7 is a perspective view showing the configuration of the side plate 700 according to the present embodiment. Specifically, FIG. 7(*a*) is a perspective view showing the side plate 700 on the X-axis plus direction side in FIG. 2, and FIG. 7(*b*) is a perspective view showing the configuration of the side plate 700 of FIG. 7(*a*) when viewed from the back side. The side plate 700 on the X-axis minus direction side in FIG. 2 also has the same configuration.

As shown in FIG. 7, the side plate 700 includes a side plate main body portion 710, a side plate first wall portion 720, a side plate second wall portion 730, and a side plate third wall portion 740.

The side plate main body portion 710 is a rectangular and plate-shaped portion that is disposed on the X-axis plus direction side of the insulator main body portion 610 and that extends in the Y-axis direction and is parallel to the YZ plane. The side plate first wall portions 720 are long and plate-shaped portions that protrude from the end portions on both sides of the side plate main body portion 710 in the Y-axis direction to the X-axis minus direction side and are extended in the Z-axis direction, and are fixed to the end members 400. The side plate second wall portion 730 is a long and plate-shaped portion that protrudes from the end portion of the side plate main body portion 710 on the Z-axis plus direction side to the X-axis minus direction side and extends in the Y-axis direction, and is inserted and disposed in the insulator first wall portion 620 (see FIG. 10(*b*)). The side plate third wall portion 740 is a long and plate-shaped portion that protrudes from the end portion of the side plate main body portion 710 on the Z-axis minus direction side to the X-axis minus direction side and extends in the Y-axis direction, and is inserted and disposed in the insulator second wall portion 630 (see FIG. 10(*c*)).

The side plate main body portion 710 has a concave portion 711 recessed in the outer edge on the Z-axis plus direction side and a concave portion 712 recessed in the outer edge on the Z-axis minus direction side at both end portions in the Y-axis direction. That is, the concave portion 711 is a notch-shaped concave portion in which the outer edge of the side plate main body portion 710 on the Z-axis plus direction side is recessed in the Z-axis minus direction, and has a curved outer edge shape. The concave portion 712 is a notch-shaped concave portion in which the outer edge of the side plate main body portion 710 on the Z-axis minus direction side is recessed in the Z-axis plus direction, and has a curved outer edge shape.

[7 Description of Positional Relationship of Each Component]

Figure 8:
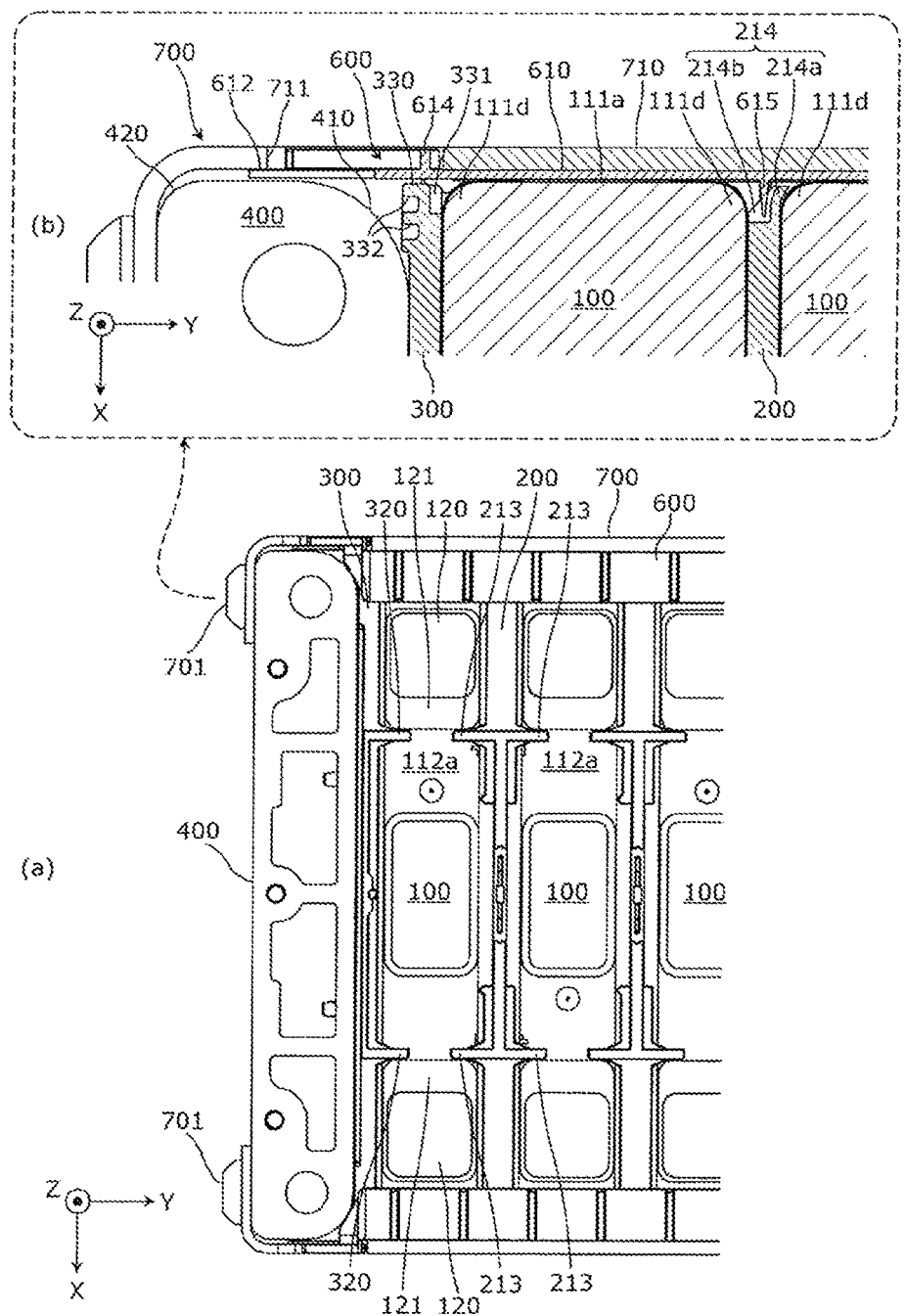
FIG. 8 is a plan view and a cross-sectional view showing a positional relationship among the energy storage device, the spacer, an end member, the insulator, and the side plate according to the embodiment.

Next, the positional relationship among the energy storage device 100, the spacers 200 and 300, the end member 400, the insulator 600, and the side plate 700 will be described in detail. FIG. 8 is a plan view and a cross-sectional view showing the positional relationship among the energy storage device 100, the spacers 200 and 300, the end member 400, the insulator 600, and the side plate 700 according to the present embodiment. Specifically, FIG. 8(a) is a plan view of the Y-axis minus direction side of the above-described component when viewed from the Z-axis plus direction, and FIG. 8(b) is a cross-sectional view of a portion of each component of FIG. 8(a) on the X-axis minus direction side and on the Z-axis plus direction side. A portion of each component on the X-axis plus direction side and a portion of each component on the X-axis minus direction side have the same configuration, and a portion of each component on the Y-axis plus direction side and a portion of each component on the Y-axis minus direction side have the same configuration. The same applies to the following.

Figure 9:
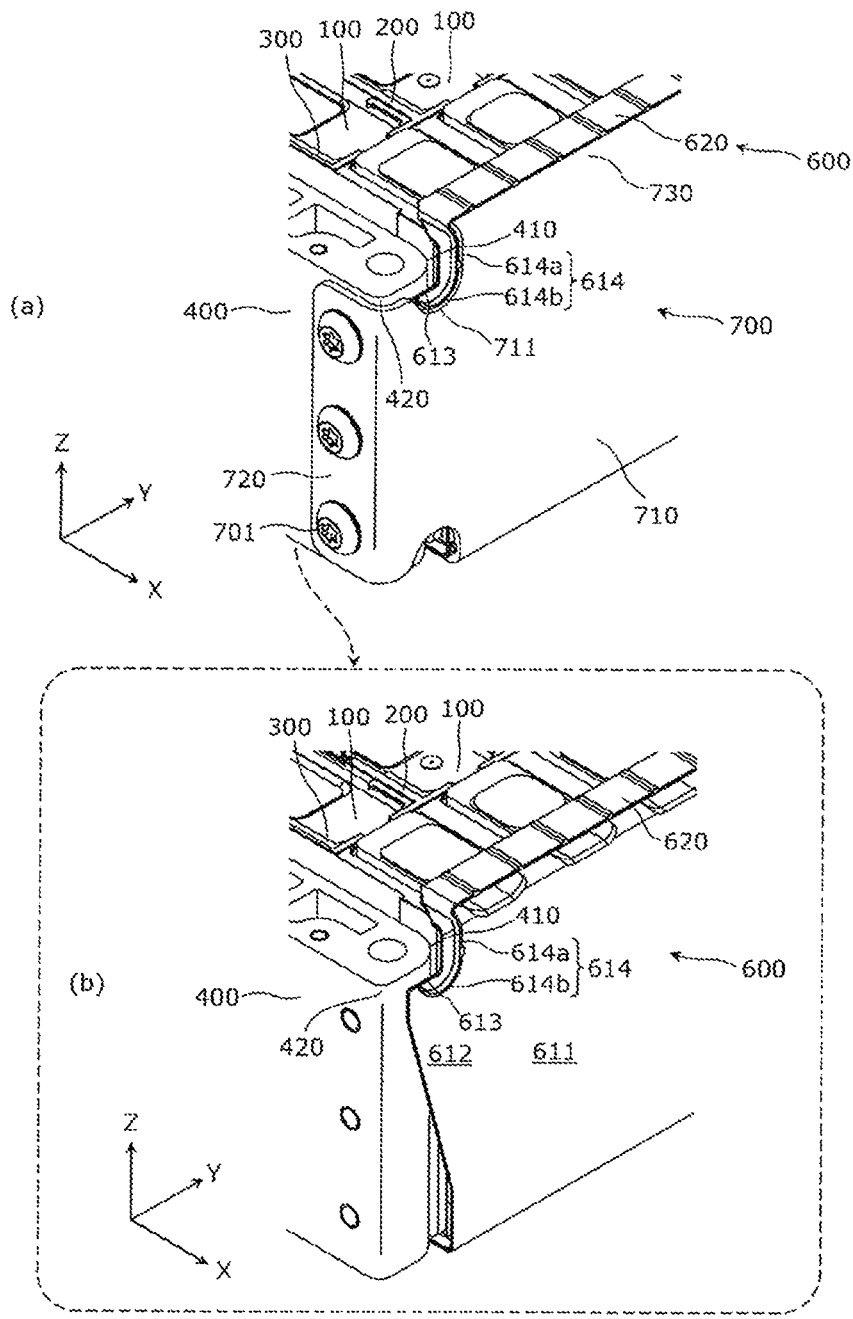
FIG. 9 is a perspective view showing a positional relationship among the energy storage device, the spacer, the end member, the insulator, and the side plate according to the embodiment.

FIG. 9 is a perspective view showing a positional relationship among the energy storage device 100, the spacers 200 and 300, the end member 400, the insulator 600, and the side plate 700 according to the present embodiment. Specifically, FIG. 9(a) is a perspective view showing a portion of the above component on the X-axis plus direction side and on the Y-axis minus direction side, and FIG. 9(b) is a perspective view showing the configuration when the side plate 700 is removed from FIG. 9(a).

FIG. 10 is a cross-sectional view showing a positional relationship among the energy storage device 100, the spacer 200, the insulator 600, and the side plate 700 according to the present embodiment. Specifically, FIG. 10(a) is a view of a cross section when the above-described component is cut along the XZ plane, as viewed from the Y-axis minus direction. FIG. 10(b) is an enlarged view of a portion on the X-axis plus direction side and on the Z-axis plus direction side of FIG. 10(a), and FIG. 10(c) is an enlarged view of a portion on the X-axis plus direction side and on the Z-axis minus direction side of FIG. 10(a). FIGS. 10(b) and 10(c) show the configuration when the spacer 200 is removed from FIG. 10(a).

First, as shown in FIG. 8(a), the first protrusions 213 and 320 of the spacers 200 and 300 are arranged so as to protrude along the convex portion (the electrode terminal 120 or the gasket 121) of the energy storage device 100. In the present embodiment, the first protrusions 213 and 320 are arranged so as to extend in a long shape along the gasket 121. That is, the first protrusions 213 and 320 are protrusions that face the X-axis direction side of the gasket 121 and protrude along the gasket 121. Specifically, the two first protrusions 213 arranged in the X-axis direction are arranged between the two gaskets 121 included in one energy storage device 100 and along the two gaskets 121. The same applies to the first protrusion 320. The two first protrusions 213 or the two first protrusions 320 may be arranged at positions sandwiching the two gaskets 121 along the two gaskets 121.

More specifically, the protrusion amount of the first protrusions 213 and 320 is formed to be smaller than half the width of the case first surface 112a of the energy storage device 100 in the Y-axis direction. As a result, the first protrusion 213 and the first protrusion 320, which are adjacent to each other in the Y-axis direction, or the two first protrusions 213 are arranged so as to face each other and are separated from each other. That is, when two spacers sandwiching the energy storage device 100 are used as one spacer and the other spacer, and one spacer has one first protrusion and the other spacer has the other first protrusion, one first protrusion and the other first protrusion are arranged so as to face each other and are separated from each other.

As shown in FIG. 8(b), the spacers 200 and 300 are arranged at positions that do not protrude from the energy storage device 100 in the X-axis direction. That is, the spacers 200 and 300 are arranged inside the energy storage device 100 in the X-axis direction when viewed from the Y-axis direction. In other words, the spacers 200 and 300 are formed so that the width in the X-axis direction is smaller than that of the energy storage device 100. Alternatively, it can be said that the spacer 200 does not have a portion facing the case second surface 111a.

The concave-convex portions formed on the second protrusions 214 and 330 of the spacers 200 and 300 are arranged separated from the energy storage device 100. Specifically, the concave-convex portion of the second protrusion 214 has a convex portion 214a on the Y-axis plus direction side and a concave portion 214b on the Y-axis minus direction side of the convex portion 214a, and the convex portion 214a and the concave portion 214b are formed so as to be arranged separated from the energy storage device 100. More specifically, the convex portion 214a protrudes in the Y-axis plus direction along the case corner portion 111d of the energy storage device 100 and is disposed so as to extend in the Z-axis direction. That is, the convex portion 214a is formed so as to protrude in a curved shape toward the case corner portion 111d in a state of being separated from the case corner portion 111d. The concave portion 214b is formed so as to be recessed in the X-axis plus direction and the Y-axis plus direction and extend in the Z-axis direction. The third rib 615 of the insulator 600 is disposed at a position facing the spacer 200 and is inserted into the concave portion 214b in the X-axis direction.

Regarding the spacer 300, the concave-convex portion of the second protrusion 330 has a concave portion 331 on the Y-axis plus direction side and a concave portion 332 on the Y-axis minus direction side, and the concave portions 331 and 332 are formed so as to be arranged separated from the energy storage device 100. The concave portion 331 is formed so as to be recessed in the X-axis plus direction and the Y-axis minus direction and extend in the Z-axis direction. The concave portion 332 is formed so as to be recessed in the Y-axis plus direction and extend in the Z-axis direction. In the present embodiment, the plurality of concave portions 332 are arranged side by side in the X-axis direction. The third rib 615 of the insulator 600 may be disposed at a position facing the spacer 300 and inserted into the concave portion 331 in the X-axis direction or may be inserted into the concave portion 332 in the Y-axis direction.

As shown in FIG. 9(a), the concave portion 711 of the side plate 700 has a shape notched more largely than the concave portion 613 of the insulator 600, and the insulator 600 is exposed from the concave portion 711. That is, the concave portion 711 is a concave portion in which the outer edge of the side plate main body portion 710 on the Z-axis plus direction side is recessed relative to the insulator 600.

Specifically, the concave portion 711 is formed to be largely recessed so that the rib 614 of the insulator 600 is exposed. That is, the rib 614 is disposed in the concave portion 711. As a result, the first rib 614a is disposed on the extending direction side (the Y-axis minus direction side in FIG. 9) of the extending portion 612 relative to the side plate 700. The second rib 614b is disposed on the electrode terminal 120 side (the Z-axis plus direction side in FIG. 9) relative to the side plate 700.

The concave portion 711 is disposed on the X-axis direction side (the X-axis plus direction side in FIG. 9) of the end member 400. Therefore, as shown in FIG. 9(b), the extending portion 612, the concave portion 613, and the rib 614 of the insulator 600 are also arranged on the X-axis direction side of the end member 400. Also as shown in FIG. 8(b), the end member 400 includes a first corner portion 410 that is a corner portion on the energy storage device 100 side (the Y-axis plus direction side) and a second corner portion 420 that is a corner portion on the opposite side (the Y-axis minus direction side) of the energy storage device 100. The first corner portion 410 has a larger radius of curvature at the outer edge than the second corner portion 420. That is, the first corner portion 410 has a larger rounded outer edge than the second corner portion 420. The concave portion 711 is formed such that its outer edge has a larger radius of curvature than the first corner portion 410. That is, the concave portion 711 has a curved outer edge, and the radius of curvature of the curved outer edge is formed to be larger than the radius of curvature of the outer edge of the first corner portion 410.

As shown in FIGS. 10(a) and 10(c), an end edge of the main body portion 211 of the spacer 200 on the Z-axis minus direction side is disposed on a side opposite to the Z-axis minus direction relative to a surface (the case third surface 111b) of the case 110 of the energy storage device 100 on the Z-axis minus direction side. That is, the spacer 200 is disposed so that the main body portion 211 does not protrude from the energy storage device 100 to the Z-axis minus direction side. An end edge of the third protrusion 215 of the spacer 200 on the Z-axis minus direction side is disposed on the same plane (on the same plane P of FIGS. 10(a) and 10(c)) as the case third surface 111b of the energy storage device 100. That is, the spacer 200 is disposed so that the third protrusion 215 also does not protrude from the energy storage device 100 to the Z-axis minus direction side. In other words, the third protrusion 215 has a shape that does not abut on the surface of the energy storage device 100 on the Z-axis minus direction side.

With such a configuration, the surface (the case third surface 111b) of the energy storage device 100 on the Z-axis minus direction side is disposed so as to abut on the insulator second wall portion 630 of the insulator 600. The third protrusion 215 of the spacer 200 is also disposed so as to abut on the insulator second wall portion 630. That is, since the case third surface 111b and the end edge of the third protrusion 215 on the Z-axis minus direction side are arranged on the same plane P, they are placed on the insulator second wall portion 630. The insulator 600 is disposed so as to abut also on the surface (the case second surface 111a) of the energy storage device 100 on the X-axis direction side. The insulator second wall portion 630 is inserted with the side plate third wall portion 740 and is fixed to the energy storage device 100.

As shown in FIGS. 10(a) and 10(b), the first pressing part 621 and the second pressing part 622 provided on the insulator first wall portion 620 of the insulator 600 press the both end portions of the energy storage device 100 in the X-axis direction toward the Z-axis minus direction. The insulator first wall portion 620 is inserted with the side plate second wall portion 730 and is fixed to the energy storage device 100. As a result, the energy storage device 100 is cooled with the case third surface 111b pressed to the cooling device 20. Since the plurality of energy storage devices 100 are pressed by one insulator 600 and pressed onto the insulator second wall portion 630, the case third surfaces 111b of the plurality of energy storage devices 100 are arranged on the same plane P. As a result, the case third surfaces 111b of the plurality of energy storage devices 100 are evenly pressed to the cooling device 20 to be cooled.

Although the spacer 200 has been described with reference to FIG. 10, the spacer 300 has also a similar configuration.

[8 Description of Effects]

As described above, according to the energy storage apparatus 10 of the present embodiment, the spacers 200 and 300 are arranged inward of the energy storage device 100 in the second direction (X-axis direction) when viewed from the first direction (Y-axis minus direction), and the concave-convex portion having at least one of the concave portion and the convex portion is formed at the end portion in the second direction. The concave-convex portion is disposed separated from the energy storage device 100. By thus arranging the spacers 200 and 300 inward of the energy storage device 100 in the second direction (that is, forming so as not to protrude from the energy storage device 100 in the second direction), it is possible to prevent the width of the energy storage apparatus 10 in the second direction from increasing. By forming the concave-convex portions, which are separated from the energy storage device 100, at the end portions of the spacers 200 and 300 in the second direction, it is possible to increase the creepage distance between the energy storage device 100 and another member (adjacent energy storage device 100, etc.) at the end portions of the spacers 200 and 300 in the second direction. This makes it possible to achieve downsizing of the energy storage apparatus 10 while achieving insulation at the end portion of the energy storage device 100 in the second direction.

The spacers 200 and 300 have the protruding portions (second protrusions 214 and 330) that protrude from the main body portions 211 and 310 in the second direction, and the concave-convex portions are formed on the protruding portions. Here, in order to increase the creepage distance, if the entire width of the spacers 200 and 300 in the second direction is widened, a part of the end portions of the spacers 200 and 300 may protrude from the end surface of the energy storage device 100 due to an error in the dimensional accuracy during manufacturing of the spacers 200 and 300. On the other hand, it may not be necessary to increase the creepage distance depending on the position because the insulating sheet 130 is disposed on the energy storage device 100. For this reason, the protruding portion is formed at a portion (a portion on the Z-axis plus direction side) of the spacers 200 and 300 where the creepage distance needs to be increased, and the concave-convex portion is formed on this protruding portion. Accordingly, it is possible to prevent the spacers 200 and 300 from protruding from the energy storage device 100 due to an error in the dimensional accuracy of the spacers 200 and 300. As described above, since the width of the energy storage apparatus 10 in the second direction can be prevented from increasing, the downsizing of the energy storage apparatus 10 can be achieved. It is also possible to reduce the amount of material used for manufacturing the spacers 200 and 300.

The concave-convex portion of the spacer 200 has the convex portion 214a protruding along the case corner portion 111d of the energy storage device 100. By thus forming the convex portion 214a protruding along the case corner portion 111d of the energy storage device 100 at the end portion of the spacer 200 in the second direction, it is possible to prevent the width of the energy storage apparatus 10 in the second direction from increasing while increasing the creepage distance at the end portion of the spacer 200 in the second direction.

The concave-convex portions of the spacers 200 and 300 have the concave portions 214b, 331, and 332 in which the surfaces of the end portions are recessed. By thus forming the concave portions 214b, 331, and 332 at the end portions of the spacers 200 and 300 in the second direction, it is possible to prevent the width of the energy storage apparatus 10 in the second direction from increasing while increasing the creepage distance at the end portions of the spacers 200 and 300 in the second direction.

Since the concave portions 214b, 331, and 332 provided in the concave-convex portions of the spacers 200 and 300 are extended in the third direction (Z-axis direction), the creepage distance at the end portions of the spacers 200 and 300 in the second direction can be increased over the third direction.

Since the concave portions 214b and 332 provided in the concave-convex portions of the spacers 200 and 300 are recessed in the direction opposite to the first direction, the creepage distance with respect to members (adjacent energy storage device 100 or the end member 400, etc.) located in the first direction of the spacers 200 and 300 can be increased. Furthermore, since a plurality of concave portions 332 are arranged side by side in the second direction, the creepage distance with respect to the end member 400 can be further increased.

The energy storage apparatus 10 includes the insulating member (insulator 600) inserted into the concave portion 214b of the spacer 200. By thus inserting the insulating member into the concave portion 214b at the end portion of the spacer 200 in the second direction, it is possible to prevent the width of the energy storage apparatus 10 in the second direction from increasing while further increasing the creepage distance at the end portion of the spacer 200 in the second direction.

In the configuration in which the energy storage device 100 and the spacers 200 and 300 are bonded by the bonding members 510 and 520, on the spacers 200 and 300, the first protruding portions that protrude from the spacer first surfaces 211a and 311 on which the bonding members 510 and 520 are arranged toward the energy storage device 100 are provided. Accordingly, when the energy storage device 100 is about to swell, the first protruding portions can suppress the swelling of the energy storage device 100 even if the joining members 510 and 520 are compressed by the swelling force of the energy storage device 100. Even if the joining members 510 and 520 are not compressed by the swelling force of the energy storage device 100 due to high hardness or the like of the joining members 510 and 520, the energy storage device 100 may swell toward portions other than the joining members 510 and 520. However, even in this case, by arrangement of the first protruding portions, it is possible to prevent the energy storage device 100 from swelling toward portions other than the joining members 510 and 520.

By forming the first protrusions 213 and 320 protruding along the convex portion (gasket 121) of the energy storage device 100 in the spacers 200 and 300, the energy storage device 100 and the spacers 200 and 300 can be positioned without provision of portions sandwiching the side surface of the energy storage device 100 on the spacers 200 and 300. Thereby, the width of the energy storage apparatus 10 can be prevented from increasing, and the energy storage apparatus 10 can be downsized.

By disposing the first member 201 having high heat resistance at the position abutting on the side surface of the energy storage device 100 on the spacer 200, it is possible to prevent the spacer 200 from deforming or melting even when the energy storage device 100 has a high temperature. The spacer 200 often has a complicated shape in order to insulate or hold the energy storage device 100, but it is generally difficult to process a member having high heat resistance into a complicated shape. Therefore, if the second member 210 is formed capable of insulating or holding the energy storage device 100 by configuring the spacer 200 to have the second member 210 that supports the end portion of the first member 201 having high heat resistance, it is not necessary to process the first member 201 into a complicated shape. In particular, since the second member 210 is formed of resin and can be formed into a complicated shape, the second member 210 can be easily formed into a structure that insulates or holds the energy storage device 100. Accordingly, the first member 201 having high heat resistance can be easily disposed on the spacer 200. As described above, since it is possible to prevent the spacer 200 from deforming or melting by the first member 201 even when the energy storage device 100 has a high temperature (for example, 600° C. or the like) due to an abnormality of the energy storage device 100, etc., it is possible to maintain the functions of the spacer 200, such as swelling suppression or heat insulating property of the energy storage device 100, and suppress the occurrence of defects.

The spacers 200 and 300 are provided with the third protrusions 215 and 340 having a shape that protrudes to the Z-axis minus direction side of the energy storage device 100 but does not abut on the surface of the energy storage device 100 on the Z-axis minus direction side. The main body portions 211 and 310 of the spacers 200 and 300 are arranged at positions that do not protrude from the surface of the energy storage device 100 on the Z-axis minus direction side by the third protrusions 215 and 340. As a result, since the surface of the energy storage device 100 on the Z-axis minus direction side can be made to abut on the cooling device 20 without obstruction by the main body portions 211 and 310 and the third protrusions 215 and 340 of the spacers 200 and 300, the energy storage device 100 can be easily cooled.

In the energy storage device 100, a current flows through the electrode terminal 120. Therefore, in order to ensure insulation between the energy storage device 100 and the conductive member (side plate 700), it is important to ensure insulation between the electrode terminal 120 of the energy storage device 100 and the conductive member. Therefore, in the first insulating member (insulator 600) between the energy storage device 100 and the conductive member, the portion on the electrode terminal 120 side is extended. This makes it possible to increase the creepage distance between the electrode terminal 120 of the energy storage device 100 and the conductive member, so that the insulation between the energy storage device 100 and the conductive member can be improved.

In the conductive member, the concave portion 711 that is recessed in the outer edge on the Z-axis plus direction side (electrode terminal 120 side) is formed. This makes it possible to increase the creepage distance between the electrode terminal 120 of the energy storage device 100 and the conductive member, so that the insulation between the energy storage device 100 and the conductive member can be improved.

In the pressing member (insulator 600 and side plate 700), in order to press all the energy storage devices 100 with a large force, it is necessary to arrange all the energy storage devices 100 so that they are pressed with a large force by all the pressing parts. Since it may be difficult to configure the pressing member, the pressing forces by the pressing parts are made different. As described above, since it is not necessary to press all the energy storage devices 100 with a large force by all the pressing parts, it is possible to easily configure the pressing member that presses the plurality of energy storage devices 100.

[9 Description of Variants]

Although the energy storage apparatus 10 according to the present embodiment has been described heretofore, the present invention is not limited to the above-mentioned embodiment. That is, the embodiment disclosed this time is an exemplification in all respects and is not restrictive, and the scope of the present invention is shown by the scope of claims, and all modifications within the meaning and scope equivalent to the claims are included.

In the above embodiment, the concave-convex portions of the spacers 200 and 300 are formed on the second protrusions 214 and 330 of the main body portions 211 and 310. However, the second protrusions 214 and 330 are not formed on the main body portions 211 and 310, and the concave-convex portions may be formed on the entire end portions of the main body portions 211 and 310.

In the above-described embodiment, all the spacers 200 have the above-mentioned configuration, but any spacer 200 may have a configuration different from the above. The same applies to the spacer 300, the energy storage device 100, the insulator 600, and the side plate 700.

The configurations which are made by arbitrarily combining the respective components which the above-mentioned embodiment and variants thereof include are also included in the scope of the present invention.

The present invention can be realized not only as such an energy storage apparatus 10 but also as the spacers 200 and 300.

INDUSTRIAL APPLICABILITY

The present invention can be applied to an energy storage apparatus or the like including an energy storage device such as a lithium ion secondary battery.

DESCRIPTION OF REFERENCE SIGNS

10: energy storage apparatus
100: energy storage device
110: case
111a: case second surface
111b: case third surface
111c: case fourth surface
111d: case corner
112a: case first surface
115: joint
120: electrode terminal
121: gasket
200, 300: spacer
201: first member
210: second member
211, 310: main body portion
211a, 311: spacer first surface
211b, 312b: joint protrusion
211c: first concave portion
211d: sandwiching part
211e: second concave portion
211f, 313: spacer second surface
212: opening
213, 320: first protrusion
214, 330: second protrusion
214a: convex portion
214b, 331, 332: concave portion
215, 340: third protrusion
221: engaging part
240, 510, 520, 530: joining member
312: first protruding portion
312a: central protruding portion
600: insulator

The invention claimed is:

1. An energy storage apparatus, comprising:
an energy storage device; and
a spacer disposed:
adjacent to the energy storage device in a first direction; and
inward of the energy storage device in a second direction orthogonal to the first direction when viewed from the first direction,
wherein the spacer includes a concave-convex portion including at least one of a concave portion and a convex portion formed at an end portion in the second direction,
wherein the concave-convex portion is disposed separated from the energy storage device,
wherein the energy storage device includes a first energy storage device and a second energy storage device adjacent to each other,
wherein the spacer includes:
a main body portion having a plate shape, the main body portion facing the energy storage device only in a direction parallel to the first direction; and
a protruding portion protruding from the main body portion in the second direction,
wherein the protruding portion includes the concave-convex portion, and
wherein the protruding portion and the first energy storage device and the second energy storage device adjacent to each other are arranged without facing each other in the second direction.

2. The energy storage apparatus according to claim 1, wherein the spacer has a main body portion and a protruding portion that protrudes from the main body portion in the second direction, and
wherein the concave-convex portion is formed on the protruding portion.

3. The energy storage apparatus according to claim 1, wherein the concave-convex portion includes the convex portion protruding in a direction approaching to the energy storage device.

4. The energy storage apparatus according to claim 3, wherein the energy storage device has a long side surface and a short side surface, and
wherein the corner is disposed between the long side surface and the short side surface.

5. The energy storage apparatus according to claim 1, wherein the concave-convex portion includes the concave portion.

6. The energy storage apparatus according to claim 5, wherein the concave portion is extended in a third direction intersecting the first direction and the second direction.

7. The energy storage apparatus according to claim 5, wherein the concave portion is recessed in a direction away from the energy storage device.

8. The energy storage apparatus according to claim 5, further comprising an insulating member inserted into the concave portion.

9. The energy storage apparatus according to claim 1, wherein the protruding portion is interposed between the first energy storage device and the second energy storage device adjacent to each other in the direction parallel to the first direction.

10. The energy storage apparatus according to claim 1, wherein a length of the spacer in the second direction is smaller than a length of the energy storage device in the second direction.

11. The energy storage apparatus according to claim 1, wherein the concave-convex portion includes the concave portion,
wherein the energy storage device includes:
a case including:
a case main body including an opening; and
a lid body closing the opening,
wherein the second direction is orthogonal to both of the first direction and a direction in which the case main body and the lid body are arranged, and
wherein the spacer is placed so as not to protrude from the energy storage device in the second direction.

12. The energy storage apparatus according to claim 11, wherein the spacer is disposed only inward of the energy storage device in the second direction orthogonal to the first direction when viewed from the first direction.

13. The energy storage apparatus according to claim 1, wherein the spacer is disposed only inward of the energy storage device in the second direction orthogonal to the first direction when viewed from the first direction, and
wherein the energy storage device includes:
a case including:
a case main body including an opening; and
a lid body closing the opening,
wherein the second direction is orthogonal to both of the first direction and a direction in which the case main body and the lid body are arranged.

14. The energy storage apparatus according to claim 1, wherein the spacer is disposed only inward of the energy storage device in the second direction orthogonal to the first direction when viewed from the first direction.

15. The energy storage apparatus according to claim 1, wherein the energy storage device includes:
a case including:
a case main body including an opening; and
a lid body closing the opening,
wherein the second direction is orthogonal to both of the first direction and a direction in which the case main body and the lid body are arranged.

16. An energy storage apparatus, comprising:
an energy storage device; and
a spacer disposed:
adjacent to the energy storage device in a first direction; and
only inward of the energy storage device in a second direction orthogonal to the first direction when viewed from the first direction,
wherein the spacer includes a concave-convex portion including at least one of a concave portion and a convex portion formed at an end portion in the second direction,
wherein the concave-convex portion is disposed separated from the energy storage device,
wherein the energy storage device includes:
a case including:
a case main body including an opening; and
a lid body closing the opening,
wherein the second direction is orthogonal to both of the first direction and a direction in which the case main body and the lid body are arranged.

17. The energy storage apparatus according to claim 16, wherein the concave-convex portion includes the concave portion, and
wherein the spacer is placed so as not to protrude from the energy storage device in the second direction.

18. The energy storage apparatus according to claim 16, wherein a length of the spacer in the second direction is smaller than a length of the energy storage device in the second direction.

19. An energy storage apparatus, comprising:
an energy storage device; and
a spacer disposed:
adjacent to the energy storage device in a first direction; and
inward of the energy storage device in a second direction orthogonal to the first direction when viewed from the first direction,
wherein the spacer includes a concave-convex portion including at least one of a concave portion and a convex portion formed at an end portion in the second direction,
wherein the concave-convex portion is disposed separated from the energy storage device,
wherein the concave-convex portion includes the concave portion,
wherein the energy storage device includes:
a case including:
a case main body including an opening; and
a lid body closing the opening,
wherein the second direction is orthogonal to both of the first direction and a direction in which the case main body and the lid body are arranged, and
wherein the spacer is placed so as not to protrude from the energy storage device in the second direction.

20. The energy storage apparatus according to claim 19, wherein an end surface of the spacer is inward from an end surface of the energy storage device in the second direction.

* * * * *